US012669622B2

(12) United States Patent
Otaki et al.

(10) Patent No.: US 12,669,622 B2
(45) Date of Patent: Jun. 30, 2026

(54) RADIATION IMAGING APPARATUS

(71) Applicant: KONICA MINOLTA, INC., Tokyo (JP)

(72) Inventors: Junichiro Otaki, Hachioji (JP); Masaki Suzuki, Hachioji (JP); Hajime Ishimoto, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 173 days.

(21) Appl. No.: 18/110,701

(22) Filed: Feb. 16, 2023

(65) Prior Publication Data

US 2023/0273329 A1      Aug. 31, 2023

(30) Foreign Application Priority Data

Feb. 28, 2022    (JP) ................................. 2022-028801

(51) Int. Cl.
    *G01T 1/24*         (2006.01)
    *G21F 1/08*         (2006.01)
(52) U.S. Cl.
    CPC .............. *G01T 1/244* (2013.01); *G21F 1/085* (2013.01)
(58) Field of Classification Search
    CPC ............ G01T 1/244; G01T 1/20; G21F 1/085
    See application file for complete search history.

(56) References Cited

U.S. PATENT DOCUMENTS

| | | | |
|---|---|---|---|
| 10,754,047 B2 | 8/2020 | Shimizukawa et al. | |
| 11,579,316 B2 | 2/2023 | Otaki et al. | |
| 12,196,895 B2 | 1/2025 | Otaki et al. | |
| 2009/0014659 A1* | 1/2009 | Hennessy | ........... G01T 1/20189 |
| | | | 378/189 |
| 2011/0180890 A1* | 7/2011 | Sato | ........................ H10F 39/80 |
| | | | 257/E31.086 |
| 2013/0221229 A1* | 8/2013 | Jagannathan | ......... G01T 1/2006 |
| | | | 250/361 R |
| 2017/0269235 A1* | 9/2017 | Sano | ....................... G01T 1/247 |

(Continued)

FOREIGN PATENT DOCUMENTS

| | | |
|---|---|---|
| JP | 2011247853 A | 12/2011 |
| JP | 2013072646 A | 4/2013 |

(Continued)

OTHER PUBLICATIONS

Japanese Office Action (and an English language translation thereof) dated Apr. 22, 2025, issued in counterpart Japanese Application No. 2022-028801.

(Continued)

*Primary Examiner* — Edwin C Gunberg
*Assistant Examiner* — Richard O Toohey
(74) *Attorney, Agent, or Firm* — Holtz, Holtz & Volek PC

(57)                ABSTRACT

A radiation imaging apparatus that images a radiation image includes a radiation detector that detects radiation; a supporter that includes charging material and that supports the radiation detector, a conductive layer provided between the radiation detector and the supporter, an electronic circuit; and an electric wiring that passes a lateral surface of the supporter and that connects the radiation detector with the electronic circuit. The conductive layer is positioned on a surface of the supporter outside a plan view region of the radiation detector in a position facing at least a portion of the electric wiring.

5 Claims, 12 Drawing Sheets

(56)         References Cited

U.S. PATENT DOCUMENTS

2017/0325761 A1*  11/2017  Wojcik .................... A61B 90/39
2018/0275287 A1*   9/2018  Itaya ................... G01T 1/20189
2019/0277981 A1*   9/2019  Shimizukawa ....... G01T 1/2006
2019/0353805 A1*  11/2019  Konkle ................. H10F 39/195
2022/0018976 A1*   1/2022  Bogumil ............. G01T 1/20189

FOREIGN PATENT DOCUMENTS

JP           2019113402  A  *  7/2019   .............. G01T 7/00
JP           2019152595  A     9/2019
JP           2021169964  A    10/2021

OTHER PUBLICATIONS

Japanese Office Action (and an English language translation thereof)
dated Jul. 1, 2025, issued in counterpart Japanese Application No.
2022-028801.
Japanese Office Action (and an English language translation thereof)
dated Nov. 4, 2025, issued in counterpart Japanese Application No.
2022-028801.

* cited by examiner

RADIATION IMAGING APPARATUS

TECHNICAL FIELD

The present invention relates to a radiation imaging apparatus.

DESCRIPTION OF THE RELATED ART

In recent years, portable (also called cassette type) radiation imaging apparatuses which can be separated from an imaging stage and carried have been developed and put into practical use. Such radiation imaging apparatus may be called a Flat Panel Detector because of its panel-like shape. A radiation detector that detects the radiation and a supporter that supports the radiation detector are provided inside the FPD.

In a situation that the FPD is used in the medical field, noise may occur by the charging phenomenon due to the vibration caused by pressure by the patient being examined, movement of the bed, and movement of the patient.

Regarding the above, JP 2011-247853 describes that a conductive layer is provided on the surface of the radiation detector on the supporter side in order to suppress the noise due to the vibration

SUMMARY OF THE INVENTION

The supporter may be formed by a bead method foam in order to reduce the weight. However, the bead method foam is more easily charged than metal and resin. Moreover, the bead method foam easily vibrates and the distance of the movement during the vibration is large. Therefore, the noise that occurs becomes large. Such noise causes unevenness in the imaged image.

In an imaging method in which the radiation imaging apparatus is not linked with the FPD and the irradiation of radiation is detected by using some of the output signals of the FPD, even if the radiation is not irradiated, an erroneous detection showing that the radiation is irradiated may be made by the noise.

JP 2011-247853 does not consider the situation in which the material of the supporter is the bead method foam that is easily charged. Therefore, the above-described problem is not solved.

The present invention is conceived in view of the above problems, and the purpose of the present invention is to provide a radiation imaging apparatus that is able to suppress the influence of charging in the supporter including charging material.

To achieve at least one of the abovementioned objects, according to an aspect of the present invention, a radiation imaging apparatus that images a radiation image reflecting one aspect of the present invention includes a radiation detector that detects radiation; a supporter that includes charging material and that supports the radiation detector, a conductive layer provided between the radiation detector and the supporter, an electronic circuit; and an electric wiring that passes a lateral surface of the supporter and that connects the radiation detector with the electronic circuit, wherein the conductive layer is positioned on a surface of the supporter outside a plan view region of the radiation detector in a position facing at least a portion of the electric wiring.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION

Hereinafter, embodiments of the present invention are described below with reference to the drawings. However, the scope of the present invention is not limited to the illustrated examples.

First, the schematic configuration of a radiation imaging apparatus 100 according to the present embodiment is described.

The radiation imaging apparatus 100 is for generating a radiation image according to received radiation.

[1. Case]

Figure 1A:
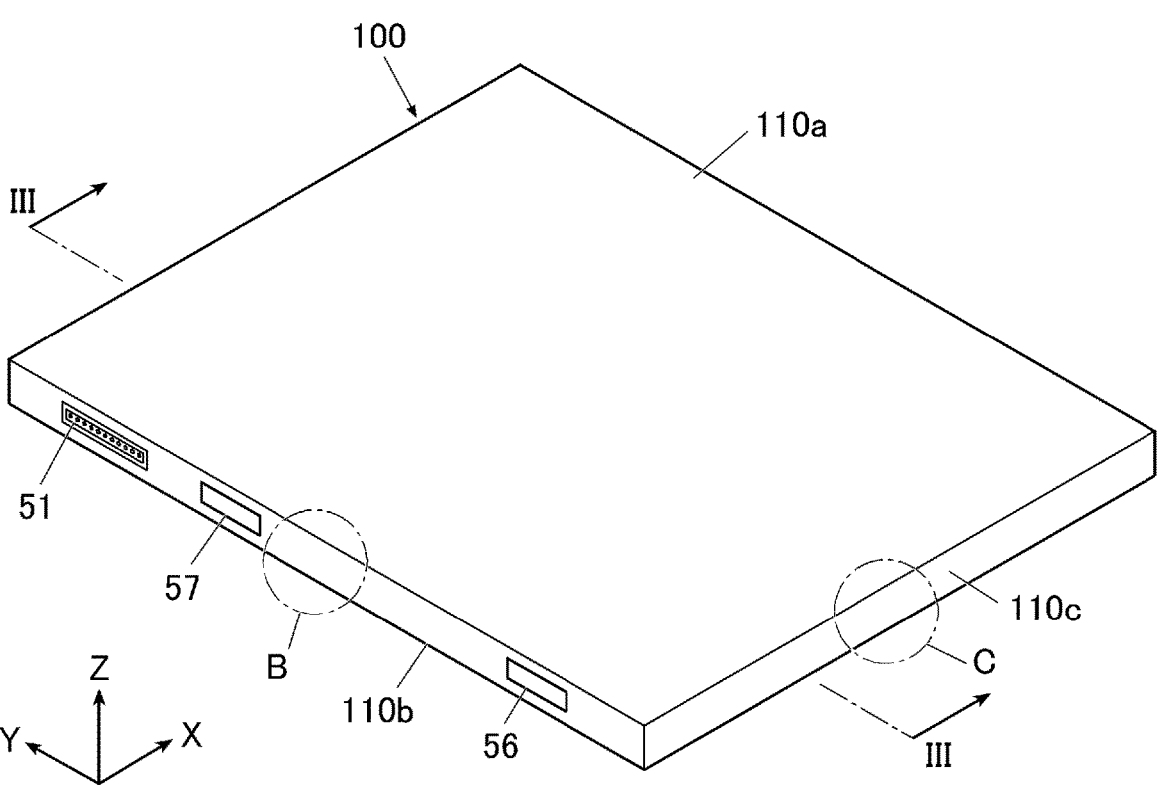
FIG. 1A is a perspective view when a front surface and some lateral surfaces of a radiation imaging apparatus according to an embodiment of the present invention is viewed.

The radiation imaging apparatus 100 includes a case 110 shaped in a rectangle shape in a plan view. FIG. 1A is a perspective view viewing a front surface 100a in which radiation is incident and some lateral surfaces 110c in a case 110. The surface of the case 110 opposite to the front surface 110a is a rear surface 110b.

In FIG. 1A, an X-axis direction is a direction parallel to a short side of the case 110. The Y-axis direction is a direction parallel to a long side of the case 110. The Z-axis direction is a thickness direction of the case 110. A direction of an arrow of each axis is to be a direction in a plus (+) direction. That is, a side on which a connector 51, an antenna 56, and an operator 57 which are described later are provided is to be a minus (−) direction in the X-axis direction. A direction from the antenna 56 to the connector 51 is to be a plus (+) direction in the Y-axis direction. A direction from the rear surface 110b to the front surface 110a is to be a plus (+) direction in the Z-axis direction.

Figure 1B:
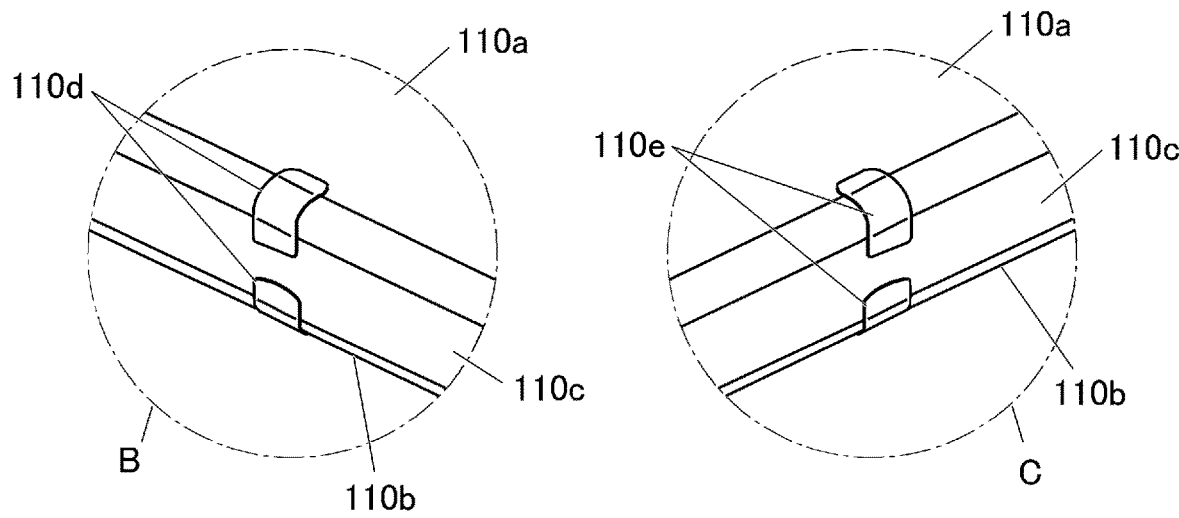
FIG. 1B is an enlarged diagram showing a region B and a region C marked in FIG. 1A.

FIG. 1B is an enlarged diagram of the region B and the region C shown in FIG. 1A.

As shown in FIG. 1B, the case 110 includes non-graining portions 110d and 110e, and graining processing is performed on portions other than the non-graining portions 110d and 110e.

The non-graining portion 110d shows a center of a long side of the case 110, and the non-graining portion 110e shows a center of a short side of the case 110.

Conventionally, a difference in a level of the sides was made in the center of the long side and the short side of the case in order to show the center. However, if such difference in the level is made in the case, stress is concentrated in such difference when a load is applied to the case. This causes damage to the case. Moreover, dirt accumulated in such difference. As described above, the center is indicated by making a fine difference on the surface between the surface of the non-graining portions 110d and 110e and the surface in the other portions where graining processing is performed. With this, it is possible to prevent damage and dirt on the case.

Figures 2, 3:
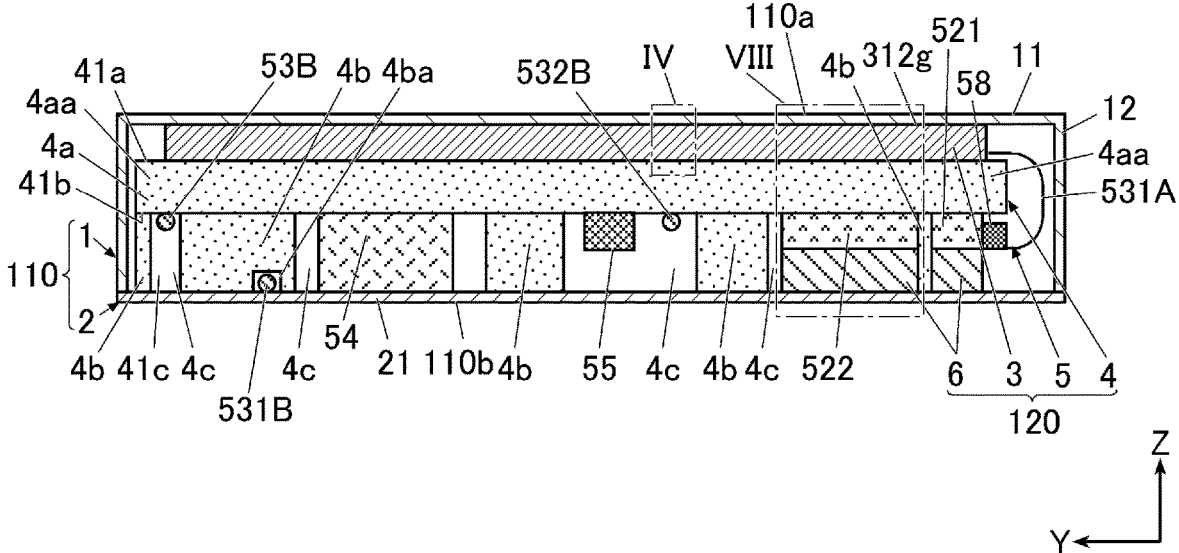
FIG. 2 is a diagram showing a radiation imaging apparatus in a state without a lid and cushioning material, viewed from a rear surface.
FIG. 3 is a cross-sectional view of the radiation imaging apparatus from line III-III shown in FIG. 1A.

FIG. 2 is a diagram showing a radiation imaging apparatus 100 viewed from a rear surface 110b side (Z-axis minus side) in a state without a lid 2 (later-described) and cushioning material 6 (later-described).

As shown in FIG. 1A. FIG. 1B and FIG. 2, the connector 51, the antenna 56, and the operator 57 are provided on a lateral surface 110c of the case 110.

The connector 51 is configured to receive power from outside by wired connection, and to communicate with external devices.

The antenna 56 is configured to perform wireless communication with external devices.

The operator 57 is a switch such as a power switch, selector switch, or the like.

FIG. 3 is a cross-sectional view of the radiation imaging apparatus 100 from line III-III shown in FIG. 1A.

As shown in FIG. 3, the case 110 includes a box 1 and a lid 2, and is a rectangular panel.

The case 110 stores an internal module 120.

The case 110 is formed of material that transmits radiation.

For example, material used in the case 110 may be carbon fiber reinforced plastic (CFRP) that includes short fibers, glass fiber reinforced plastic (GFRP), light metals, or alloys containing light metals, carbon fiber reinforced thermoplastic (CFRTP), and the like. In a situation that the material of the case 110 is carbon fiber reinforced (thermo) plastic or glass fiber reinforced plastic, the case 110 can be formed using sheet molding compound (SMC) which is a material including fibers shorter than prepreg.

Light metals include metals with a relatively low specific gravity such as aluminum and magnesium.

According to the above, the case 110 can be made lighter while maintaining rigidity of the case 110.

Specifically, since the carbon fiber reinforced plastic has a large radiation transmittance, the radiation transmits through the subject without attenuation midway, and reaches the internal module 120. Therefore, the image quality of the radiation image can be enhanced more than in a situation that other material is used in the case 110.

An antibacterial treatment is performed on the case 110 by performing the treatment on the entire surface or by blending treated material.

The case 110 may be provided with a protective member at the corner (at least any of four corners of the front surface portion 11 and four corners of the rear surface portion 21).

The material used in the protective member may be metal. Alternatively, since the radiation imaging apparatus 100 according to the present embodiment is light-weight and impact received by collision is small, the material can be an elastic body (resin, rubber, elastomer, etc.).

At least one of the color and/or the shape in at least one of the protective members may be different from the other protective members. According to the above, depending on the position of the protective member in which at least one of the color and/or the shape is different from the other protective members, the orientation of the radiation imaging apparatus 100 can be easily identified.

[1-1. Box]

As shown in FIG. 3, the box 1 includes a front surface portion 11 and a lateral surface portion 12.

The front surface portion 11 and the lateral surface portion 12 are formed as one.

Alternatively, the front surface portion 11 and the lateral surface portion 12 may be separate components.

(1-1-1. Front Surface Portion)

The front surface portion 11 faces a later-described imaging surface 312g of the radiation detector 3 and spreads to be parallel with the imaging surface 312g.

An outer side surface of the front surface portion 11 is to be a radiation incident surface 110a (front surface) of the radiation imaging apparatus 100 (case 110).

The front surface portion 11 is formed in a rectangular plate shape.

Figure 4:
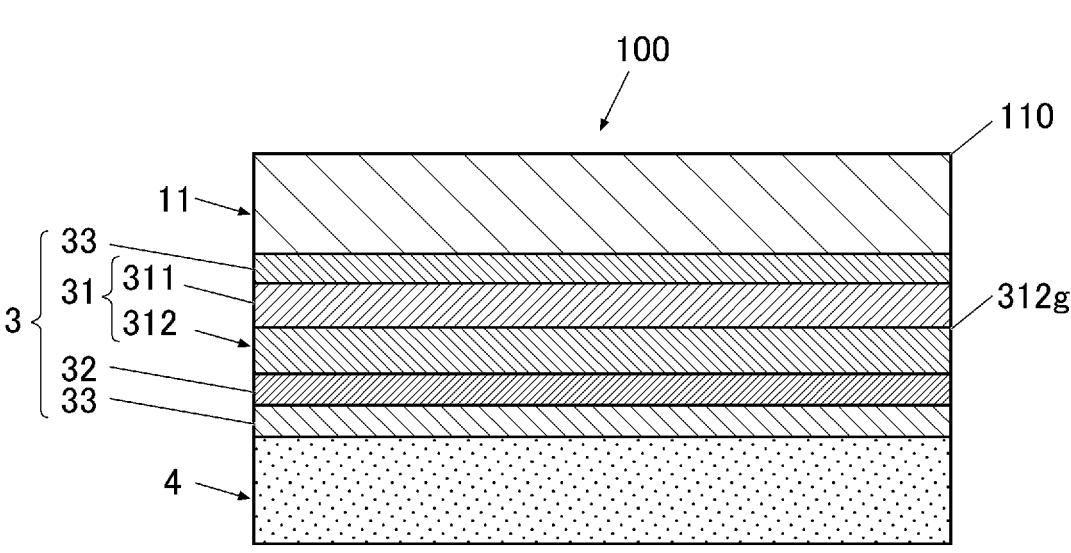
FIG. 4 is a partial cross-sectional view of a portion IV shown in FIG. 3.

A frame (rot shown) on the radiation incident surface 110a shows a range of an effective image region (region in which a plurality of semiconductor elements 312b (see FIG. 5) are arranged) in the sensor panel 31 as a convertor (see FIG. 4).

(1-1-2. Lateral Surface Portion)

The lateral surface portion 12 extends from a peripheral of the front surface portion 11 in a direction orthogonal to the radiation incident surface 110a and in a direction where the rear surface portion 21 is (Z-axis minus direction).

The outer side surface of the lateral surface portion 12 is to be the lateral surface 110c of the radiation imaging apparatus 100 (case 110).

[1-2. Lid]

As shown in FIG. 3, the lid 2 includes a rear surface portion 21.

The lid 2 according to the present embodiment is to be the entire rear surface portion 21.

The rear surface portion 21 faces the front surface portion 11 of the box 1 with the internal module 120 in between and spreads parallel to the front surface portion 11.

The outer side surface of the rear surface portion 21 is to be the rear surface 110b of the radiation imaging apparatus 100 (case 110).

The lid 2 (rear surface portion 21) is in contact with the lateral surface portion 12 of the box 1 and is attached to the lateral surface portion 12.

With this, the lateral surface portion 12 connects the front surface portion 11 and the rear surface portion 21.

The lid 2 according to the present embodiment is fixed to the box 1 with screws.

Therefore, when the radiation imaging apparatus 100 is repaired or maintenance processes are performed in the radiation imaging apparatus 100, the rear surface portion 21 can be separated from the front surface portion 11 and the lateral surface portion 12 by simply loosening the screws and removing the rear surface portion 21. That is, a person who performs maintenance processes on the radiation imaging apparatus 100 can easily access to the internal module 120 stored by the front surface portion 11 and the lateral surface portion 12.

A waterproof structure can be configured by placing a seal between the lid 2 and the box 1 and then fixing by screws or adhering. Since water does not enter, it is possible to prevent the foam material absorbing moisture and to prevent moisture having an influence on the sensor panel and electric components.

[1-3. Others]

FIG. 3 illustrates a case 110 (box 1) in which the lateral surface portion 12 is formed as one with the front surface portion 11. Alternatively, the case 110 may be configured so that the lateral surface portion 12 is formed as one with the rear surface portion 21 or the front surface portion 11, the lateral surface portion 12, and the rear surface portion 21 can each be formed as separate components.

FIG. 3 illustrates the case 110 including the box 1 and the lid 2. Alternatively, the case 110 may include a cylinder-like body formed in a cylinder shape including a front surface portion 11, a rear surface portion 21, and a pair of lateral surface portions 12 connecting both ends of the front surface portion 11 with both ends of the rear surface portion 21 and a lid that closes an opening of the cylinder-like body.

[2. Internal Module]

The internal module 120 is fixed on the inner surface of the front surface portion 11.

The method to fix the internal module 120 to the case 110 includes adhering with adhesive, adhering with adhesive tape, fitting in a concave or convex portion formed on the inner surface and engaging to an engaging portion formed on the inner surface.

With this, when impact is received from a direction substantially orthogonal to the lateral surface 110c of the radiation imaging apparatus 100 (X-axis direction, Y-axis direction), it is possible to prevent the internal module 120 from moving. Consequently, it is possible to prevent damage on the internal module 120.

The internal module 120 is fixed to the inner surface of the rear surface portion 21 and the inner surface of the lateral surface portion 12.

The internal module 120 may be fixed to the inner surface of the front surface portion 11 and the inner surface of the rear surface portion 21, the inner surface of the front surface portion 11 and the inner surface of the lateral surface portion 12, or the inner surface of the lateral surface portion 12 and the inner surface of the rear surface portion 21.

Alternatively, the internal module 120 may be fixed to the inner surface of the front surface portion 11, the inner surface of the lateral surface portion 12, and the inner surface of the rear surface portion 21.

The internal module 120 includes a radiation detector 3, a supporter 4, an electric component 5, and a cushioning material 6.

[2-1. Radiation Detector]

As shown in FIG. 3, the radiation detector 3 is provided between the front surface portion 11 of the case 110 and the supporter 4 with an adhesive layer (not shown) in between.

FIG. 4 is a partial cross-sectional view of a portion IV shown in FIG. 3.

As shown in FIG. 4, the radiation detector 3 includes a sensor panel 31, a radiation screening layer 32, and an electromagnetic field shield layer 33.

(2-1-1. Sensor Panel)

The sensor panel 31 according to the present embodiment is provided between the radiation screening layer 32 and the electromagnetic field shield layer 33.

The sensor panel 31 according to the present embodiment includes a wavelength convertor 311 and a photoelectric convertor 312.

The wavelength convertor 311 is for converting radiation to visible light.

The wavelength convertor 311 according to the present embodiment is provided between the electromagnetic field shield layer 33 and the electromagnetic convertor 312.

The wavelength convertor 311 according to the present embodiment is positioned so as to spread parallel with the radiation incident surface 110a of the case 110.

The wavelength convertor 311 according to the present embodiment includes a supporting layer and a phosphor layer which are not shown.

The supporting layer is formed into a film shape (thin plate) with a flexible material.

Flexible materials include, for example, polyethylene naphthalate, polyethylene terephthalate (PET), polycarbonate, polyimide, polyamide, polyetherimide, aramid, polysulfone, polyethersulfone, fluororesin, polytetrafluoroethylene (PTFE), or a composite material mixing at least two or more of the above.

In particular, among the above materials, polyimide, polyamide, polyetherimide. PTFE, or the composite material of the above is preferable from the viewpoint of improving heat resistance.

The supporting layer according to the present embodiment is formed in a rectangular shape.

The phosphor layer is formed of phosphor on a surface of the supporting layer.

The phosphor is a substance that emits light when atoms are excited by irradiating ionized radiation such as a rays, γ rays, and X-rays. That is, phosphors convert radiation to ultraviolet rays and visible light.

For example, columnar crystals of cesium iodide (CsI) can be used as the phosphor.

The phosphor layer according to the present embodiment is formed on the entire surface facing the photoelectric convertor 312 in the supporting layer.

That is, the wavelength convertor 311 is formed in a rectangular shape.

The phosphor layer according to the present embodiment is thick enough to be able to bend (elastically deform) when the supporting layer bends.

The wavelength convertor 311 configured as described above is a plate shape with flexibility, and the region that receives radiation emits light at a strength according to the amount of received radiation.

The photoelectric convertor 312 is for converting the light into electric signals.

The photoelectric convertor 312 according to the present embodiment is provided between the wavelength convertor 311 and the radiation screening layer 32.

The photoelectric convertor 312 according to the present embodiment is positioned so as to spread parallel with the wavelength convertor 311.

The photoelectric convertor 312 is attached to the wavelength convertor 311.

Figure 5:
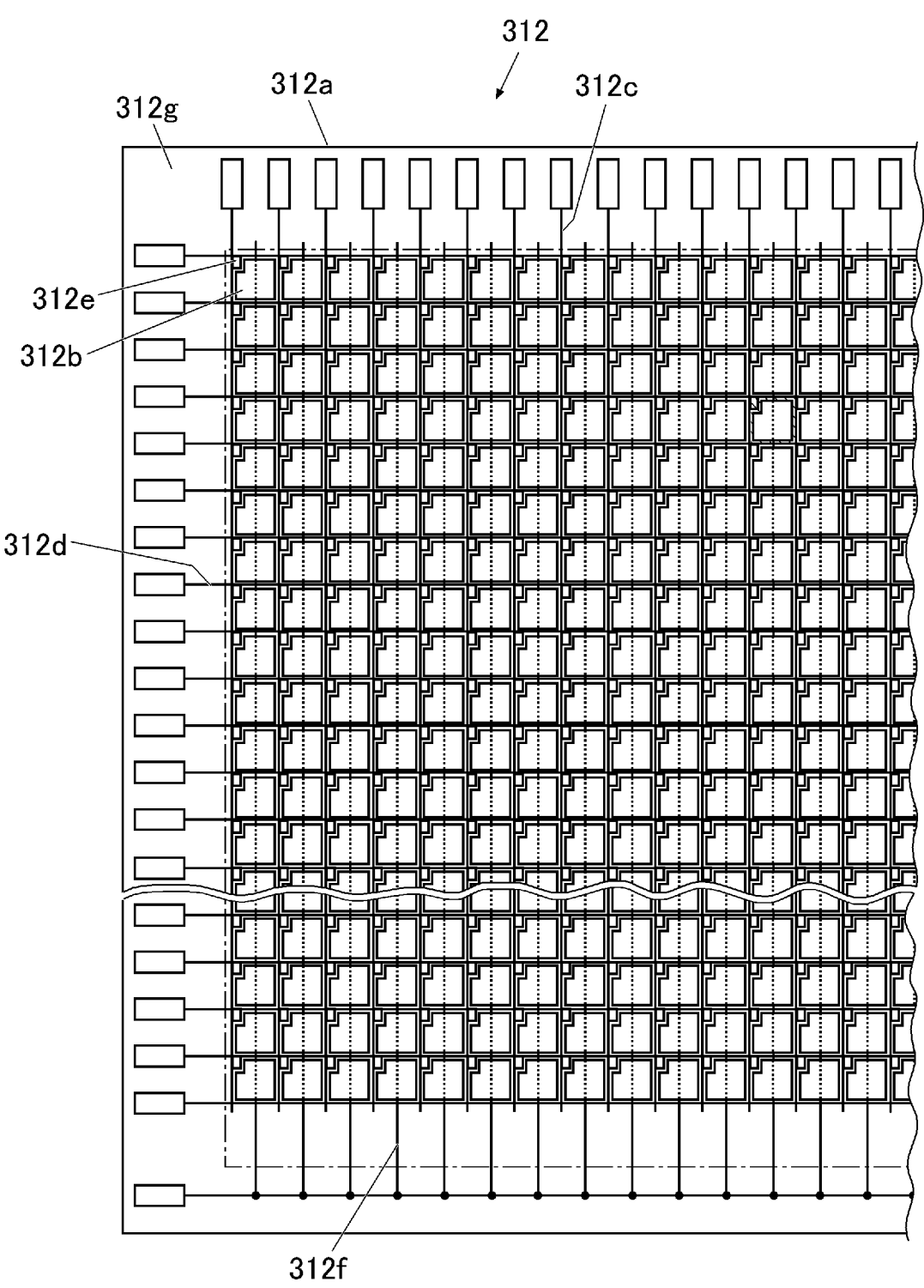
FIG. 5 is a plan view showing an example of a photo-electric convertor.

As shown in FIG. 5, the photoelectric convertor 312 includes a substrate 312a, a plurality of semiconductor elements 312b, a plurality of scanning lines 312c, a plurality of signal lines 312d, a plurality of switch elements 312e, and a plurality of bias lines 312f.

The substrate 312a is formed into a film shape (thin plate shape) with the flexible material described above.

The shape of the substrate 312a according to the present embodiment from the front view is a rectangle substantially equal to the wavelength convertor 311.

The substrate 312a according to the present embodiment is formed of the same material as the supporting layer of the wavelength convertor 311.

That is, the substrate 312a according to the present embodiment has flexibility, and heat expansion rate and heat shrinkage rate of the substrate 312a is equal to the heat expansion rate and the heat shrinkage rate of the supporting layer.

Therefore, when heat expansion of the photoelectric convertor 312 occurs, heat expansion of the wavelength convertor 311 also occurs. Consequently, the layered body including the photoelectric convertor 312 and wavelength convertor 311 hardly bends. As a result, a shift between the light emitting position in the wavelength convertor 311 and the opposing semiconductor element 312b hardly occurs. With this, it is possible to prevent the image quality of the radiation image worsening.

The substrate 312a can be formed with a material that is different from the supporting layer but has the same heat expansion rate and heat shrinkage rate as the supporting layer.

Each of the plurality of semiconductor elements 312b generate charge in an amount according to the strength of the received light.

The plurality of semiconductor elements 312b are formed so as to be distributed two-dimensionally on the surface of the substrate 312a.

Specifically, the plurality of semiconductor elements 312b are arranged in a matrix (matrix shape) on a surface of the substrate 312a in contact with (attached to) the wavelength convertor 311.

The plurality of semiconductor elements 312b according to the present embodiment are arranged in a matrix shape at the center of the imaging surface 312g. Specifically, the plurality of semiconductor elements 312b are positioned in each of a plurality of rectangular regions on a surface of the substrate 312a (each rectangular region corresponds to each pixel of the radiation image). The plurality of rectangular regions are surrounded by a plurality of scanning lines 312c (not shown) formed to be evenly spaced and to extend parallel to each other, and a plurality of signal lines 312d (not shown) formed to be evenly spaced and to be orthogonal to the scanning lines.

A switch element 312e is provided in each rectangular region. The switch element 312e is configured with TFT, for example, and a gate of each switch element 312e is connected to the scanning line 312c, a source of each switch element 312e is connected to the signal line 312d, and a drain of the switch element 312e is connected to the semiconductor element 312b.

The surface in which the semiconductor element 312b is formed on the substrate 312a is referred to as an imaging surface 312g.

The photoelectric convertor 312 configured as described above has flexibility, and the imaging surface 312g in which the semiconductor element 312b is formed is positioned to face toward the wavelength convertor 311.

The sensor panel 31 including the wavelength convertor 311 and the photoelectric convertor 312 as described above is formed using flexible material. Therefore, even if the radiation imaging apparatus 100 receives impact, the sensor panel 31 is not easily damaged and the sensor panel 31 can be made lighter.

(2-1-2. Radiation Screening Layer)

The radiation screening layer 32 is to prevent scattering lines from reaching the circuit substrate 52.

As shown in FIG. 4, the radiation screening layer 32 according to the present embodiment is provided between the sensor panel 31 (photoelectric convertor 312) and the electromagnetic field shield layer 33.

Preferably, metal, specifically lead is used as the material for forming the radiation screening layer 32. Lately, from the viewpoint of environmental protection, tungsten and molybdenum are used.

Moreover, the radiation screening layer 32 according to the present embodiment fixes the sensor panel 31 with an attachment (not shown).

The radiation screening layer 32 can be provided between the radiation detector 3 and the supporter 4.

(2-1-3. Electromagnetic Field Shield Layer)

The electromagnetic field shield layer 33 is for shielding noise.

The electromagnetic field shield layer 33 is provided on at least one surface side of the imaging surface 312g of the radiation detector 3 and/or the surface on the opposite side of the imaging surface 312g.

As shown in FIG. 4, the electromagnetic field shield layer 33 according to the present embodiment is provided on both the imaging surface 312g side and the surface side on the opposite side.

The electromagnetic field shield layer 33 on the imaging surface 312g side is attached to the inner surface of the front surface portion 11 by an adhesive layer not shown, and the electromagnetic field shield layer 33 on the surface side on the opposite side of the imaging surface 312g is attached to the supporter 4 by an adhesive layer not shown.

The electromagnetic field shield layer 33 is a layer shaped member partially including a conductive material.

The electromagnetic field shield layer 33 according to the present embodiment includes a metal thin film, a resin film in which a metal layer is formed on the surface, a film formed from transparent conductive material (for example, indium tin oxide (ITO)), and the like.

Metal includes, for example aluminum, copper, and the like.

The method to form the metal layer includes, for example, a method to attach a metal foil, a method of vapor deposition of metal, and the like.

Preferably, a film such as AL-PET (registered trademark, manufactured by PANAC) is suitable as the electromagnetic field shield layer 33.

The electromagnetic field shield layer 33 is provided as at least one layer on one surface.

If the electromagnetic field shield layer 33 is provided on the imaging surface 312g side, the external noise entering from the front surface portion 11 side can be shielded.

If the electromagnetic field shield layer 33 is provided on the side opposite of the imaging surface 312g, the noise caused by the circuit substrate 52 can be shielded.

For example, the electromagnetic field shield layer 33 can be connected to the ground (GND). In such way, the potential of the electromagnetic field shield layer 33 can be maintained at a constant value, and the shielding effect of the noise can be enhanced.

In this case, it is preferable to place an intervening metal (for example, nickel) with a small difference in the ionization tendency from aluminum or copper.

The metals with a small difference in the ionization tendency intervene in a form such as, an intermediate member plated with a metal having a small difference in the ionization tendency, or a conductive tape including the metal with the small difference in the ionization tendency as a conductive filler.

If the metals with a large difference in the ionization tendency (for example, aluminum and copper) are placed in contact with each other, electrolytic corrosion may occur, but according to the above, it is possible to prevent electrolytic corrosion.

[2-2. Supporter]

The supporter 4 supports the radiation detector 3.

The above term "support" means not only to support the radiation detector 3 from the load received from the front surface portion 11 side but also means that the radiation detector 3 is provided on the supporter 4.

As shown in FIG. 3, the supporter 4 is provided between the radiation detector 3 and the rear surface portion 21.

According to the above, since the supporter 4 distributes the load that the case 110 receives from outside, it is possible to suppress the bend of the radiation detector 3 (sensor panel 31).

The supporter 4 is formed from a foam material.

Compared to forming the supporter 4 with metal or non-foam resin, the internal module 120 including the supporter 4 can be made lighter if the foam material is used.

The material of the foam material includes any one of polyethylene, polypropylene, polystyrene, modified polyphenylene ether, polyurethane, acrylic, and epoxy.

In general, soft resins have a lower rigidity than hard resins. The foam material including a soft resin is known to have a high rigidity as the foaming magnification becomes lower. Therefore, by adjusting the foaming magnification when the foam body is manufactured, it is possible to obtain the necessary rigidity.

Preferably, for example, the foaming magnification is to be 30 times or less, for example. According to the above, it is possible to maintain the necessary rigidity without using material with higher rigidity than the foam material (for example, fiber reinforced resin or metal) in part of the supporter 4 (for example, surface layer) and it is possible to make the supporter 4 lighter.

Preferably, the supporter 4 has substantially the same thermal expansion coefficient as the sensor panel 31.

The supporter 4 may be material with elasticity.

The sensor panel 31 has a larger thermal expansion coefficient compared to the conventional sensor panel including a glass substrate. However, according to the above, even if the sensor panel 31 expands, the supporter 4 similarly expands or elastically deforms and absorbs the expansion of the sensor panel 31. Therefore, it is possible to prevent a situation that only the sensor panel 31 expands, resulting in wrinkles in the sensor panel 31.

As shown in FIG. 2 and FIG. 3, the supporter 4 includes a plane shaped supporting portion 4a and a plurality of leg shaped supporting portion 4b.

(2-2-1. Plane Shaped Supporting Portion)

The plane shaped supporting portion 4a is provided without gaps along a surface of the photoelectric convertor 312 of the sensor panel 31 on the opposite side of the imaging surface 312g (surface of the electromagnetic field shield layer 33 on the surface side opposite to the imaging surface 312g of the photoelectric convertor 312).

The plane shaped supporting portion 4a is a plate shape that has a predetermined thickness in a direction orthogonal to the surface on the opposite side of the imaging surface 312g (Z-axis direction) and spreads parallel with such surface. According to the above, since the supporter 4 distributes the load that the case 110 receives from outside even more, it is possible to further suppress the bend of the radiation detector 3.

Regarding the plane shaped supporting portion 4a, one surface cons into contact with the radiation detector 3, and the other surface comes into contact with the circuit substrate 52, a battery 54, and an irradiation detecting sensor 55.

One surface of the plane shaped supporting portion 4a that comes into contact with the radiation detector 3 is to be referred to as the supporting surface 41a.

The supporting surface 41a according to the present embodiment is to be one size larger than the sensor panel 31. That is, the plane shaped supporting portion 4a includes an extending portion 4aa that extends from the radiation detector 3 in a direction parallel to the supporting surface 41a of the plane shaped supporting portion 4a (direction parallel with the surface formed by the X-axis and the Y-axis). Therefore, the plane shaped supporting portion 4a is able to support the entire sensor panel 31.

FIG. 3 shows the plane shaped supporting portion 4*a* with an even thickness (width of the direction orthogonal to the supporting surface 41*a* (Z-axis direction)). Alternatively, a peripheral portion of the plane shaped supporting portion 4*a* in a direction along the supporting surface 41*a* (X-axis and Y-axis direction) may be thicker than the center. According to the above, the rigidity against the load and the impact can be further enhanced.

The plane shaped supporting portion 4*a* can have a thickness in which the center is thicker than the peripheral portion.

(2-2-2. Leg Shaped Supporting Portion)

As shown in FIG. 3, the leg shaped supporting portion 4*b* is provided to project toward the rear surface portion 21 to a point where contact is made from an opposite surface 41*b* which is the surface on the opposite side of the supporting surface 41*a* of the plane shaped supporting portion 4*a*.

The region surrounded by such leg shaped supporting portion 4*b* is to be a concave portion 4*c*.

The circuit substrate 52, the battery 54, and the irradiation detecting sensor 55 are stored in the concave portion 4*c*.

The width, depth, and deepness of the concave portion 4*c* can be any size that is able to store the circuit substrate 52, the battery 54, and the irradiation detecting sensor 55.

(2-2-3. Supporter and Others)

In the supporter 4, the plane shaped supporting portion 4*a* and the leg shaped supporting portion 4*b* are molded as one with a single foam material.

In this situation, the concave portion 4*c* can be formed by cutting the portion which is planned to be the concave portion 4*c*, or the concave portion 4*c* can be formed by partial pressing. Forming the concave portion 4*c* by partial pressing is preferable.

The location where the concave portion 4*c* is formed on the supporter 4 is thinner than the other portions (leg shaped supporting portion 4*b*) (width in the direction orthogonal to the supporting surface 41*a* (Z-axis direction) is small). However, in a situation that the concave portion 4*c* is formed by partial pressing, the foaming magnification of the surface of the concave portion 4*c* decreases, and the strength of the surface increases. Therefore, the rigidity of the supporter 4 in the concave portion 4*c* can be made the same as the leg shaped supporting portion 4*b*.

The supporter 4 may be created by layering a plurality of layers of foam material formed in a sheet shape.

[2-3. Electric Components]

[2-3. Electric Components]

As shown in FIG. 2 and FIG. 3, the electric component 5 includes the connector 51, the circuit substrate 52, wiring 53A (531A. 532A) and 53B, the battery 54, the irradiation detecting sensor 55, the antenna 56, the operator 57, a readout IC 58, and the like.

The connector 51 is configured to be able to receive power from external devices by wired connection and to allow connection with external connectors in order to perform communication with external devices. The connector 51 is connected to the circuit substrate 52, and outputs the electric power and communication signal from outside to the circuit substrate 52.

The antenna 56 is configured to perform wireless communication with external devices. The antenna 56 is connected to the circuit substrate 52, and outputs communication signals from outside to the circuit substrate 52.

The operator 57 is a switch such as a power switch, selector switch, or the like. The operator 57 is connected to the circuit substrate 52, and outputs the input operation signals to the circuit substrate 52.

The readout IC 58 converts the output signal from the radiation detector 3 (photoelectric convertor 312) to image data.

(2-3-1. Circuit Substrate)

The circuit substrate 52 includes various electronic circuits.

The circuit substrate 52 includes an SIF substrate 521, a control substrate 522, a GIF substrate 523, a substrate provided with a wireless communication circuit, a substrate provided with a power supply circuit, and the like.

The SIF substrate 521 is connected to the radiation detector 3 through the wiring 531A. The SIF substrate 521 reads the output signal of the radiation detector 3 through the wiring 531A ad the readout IC 58 provided on the wiring 531A.

The control substrate 522 controls each circuit and generates image data.

The GIF substrate 523 is connected to the radiation detector 3 through the wiring 532A, and controls the gate driver IC (not shown) that is provided on the wiring 532A and that drives the gate of the switch element 312*e*.

The wireless communication circuit is the circuit to perform wireless communication with other apparatuses.

The power supply circuit is a circuit that applies voltage to the semiconductor element and supplies power to the above circuits.

As shown in FIG. 3, the circuit substrate 52 is attached to the opposite surface 41*b* of the plane shaped supporting portion 4*a* by using adhesive or adhesive tape. In this situation, the terminals can be connected by wiring using conductive tape, for example.

The circuit substrate 52 and the rear surface portion 21 of the cases 110 are separated. According to the above, it is possible to suppress the load that the case 110 receives from outside from transmitting to the circuit substrate 52.

(2-3-2. Wiring)

The wiring 53A may be a flexible printed circuit, and connects the photoelectric converter 312 and various circuit substrates 52.

The wiring 53A includes wiring 531A and wiring 532A.

The wiring 531A connects the terminals of the signal lines (semiconductor element 312*b*) of the photoelectric converter 312, the readout IC 58, and the SIF substrate 521.

The wiring 532A connects the terminals of the scanning lines (switch elements) of the photoelectric converter 312, the gate driver IC, and the GIF substrate 523.

As shown in FIG. 2, for example, the wiring 53B connects the connector 51 and the circuit substrate 52.

As shown in FIG. 3, the wiring 53B is stored in the concave portion 4*c*. The concave portion 4*c* storing the wiring 53B is a groove 41*c* for wiring.

The groove 41*c* is formed in the peripheral portion of the plane shaped supporting portion 4*a* (supporter 4).

The location where the concave portion 4*c* is formed is thinner than the other portions (leg shaped supporting portion 4*b*) (width in the direction orthogonal to the supporting surface 41*a* (Z-axis direction) is small). Therefore, when the load is applied to the radiation imaging apparatus 100, this portion tends to bend. When the load is applied in the portion near the edge (lateral surface 110*c*) of the case 110, the lateral surface 110*c* supports the load, and the bend is suppressed. Therefore, by placing the wiring 53B in a portion (the peripheral portion of the plane shaped supporting portion 4*a*) near an edge of the case 110, it is possible to suppress the bend of the groove 41*c* even when the load is applied. Then, since the bend of the radiation detector 3 is suppressed, it is possible to reduce the unevenness in the imaged image.

As shown in FIG. 3, the electric component 5 includes a GND wiring 531B and an irradiation detecting sensor wiring 532B.

The GND wiring 531B connects the circuit substrate 52 connected to the battery 54 with the case 110 which is the frame ground.

The GND wiring 531B is stored in the concave portion 4ba formed in the leg shaped supporting portion 4b so as to be positioned in a position farther from the radiation detector 3 compared to the other wiring (wiring 53B, irradiation detecting sensor wiring 532B, etc.) in the thickness direction of the radiation imaging apparatus 100 (Z-axis direction).

A large current may flow in the GND wiring 531B depending on the state of the battery 54. Such large current generates a large noise. Therefore, by positioning the GND wiring 531B in a position far from the radiation detector 3 in the thickness direction of the radiation imaging apparatus 100, it is possible to reduce the unevenness of the image due to the large noise having an influence on the radiation detector 3.

The irradiation detecting sensor wiring 532B connects the irradiation detecting sensor 55 and the circuit substrate 52.

The irradiation detecting sensor 55 outputs a detection result to the circuit substrate 52 through the irradiation detecting sensor wiring 532B.

The irradiation detecting sensor wiring 532B is attached to the plane shaped supporting portion 4a and stored in the concave portion 4c so as to be placed in a position farther from the rear surface portion 21 in the thickness direction of the radiation imaging apparatus 100 compared to the other wiring (GND wiring 531B, etc.).

The wiring 53B shown in FIG. 3 (for example, connecting the connector 51 and the circuit substrate 52) can be provided in a position the same as the irradiation detecting sensor wiring 532B in the thickness direction of the radiation imaging apparatus 100.

When wireless communication is performed using the antenna 56, an electromagnetic field is generated from the antenna wiring connected to the antenna 56. The electromagnetic field reflects on the case 110 and this may cause noise.

When the irradiation detecting sensor wiring 532B receives influence of the noise, even if the radiation is not irradiated, an erroneous detection showing that the radiation is irradiated may be made.

In view of the above, by positioning the irradiation detecting sensor wiring 532B in a position far from the rear surface portion 21 in a thickness direction of the radiation imaging apparatus 100, it is possible to suppress the influence of the noise generated by the electromagnetic field reflected on the case 110. With this, it is possible to prevent erroneous detection of radiation.

As described above, the GND wiring 531B and the irradiation detecting sensor wiring 532B (plurality of electric wiring) are provided in a position between the plane shaped supporting portion 4a (supporter 4) and the rear surface portion 21 of the case 110, and in a different position in the thickness direction of the radiation imaging apparatus 100.

In order to realize such configuration, other than storing either of the wiring in the concave portion 4ba formed in the leg shaped supporting portion 4b, the plane shaped supporting portion 4a and the leg shaped supporting portion 4b can be made thicker. Since the supporter 4 is formed from foam material, even if the supporter 4 (plane shaped supporting portion 4a and leg shaped supporting portion 4b) is made thicker, the increase in the weight is slight compared to when the supporter 4 is formed from metal.

(2-3-3. Battery)

The battery 54 supplies power to each unit of the radiation imaging apparatus 100.

According to the present embodiment, the battery 54 is a lithium ion capacitor, but may be a lithium ion battery or other rechargeable battery.

As shown in FIG. 2 and FIG. 3, the battery 54 is positioned so that the center of the battery 54 is toward the center of the case 110 between the edge of the case 110 (lateral surface 110c) and the center, and the battery 54 supports the radiation detector 3. Specifically, it is preferable to position the battery 54 in a range 10×12 inches (about 25×30 cm) from the center of the rear surface portion 21 which is near the center where the load is applied. This is because most of the load in portable imaging is applied in this range. Preferably, the battery 54 is positioned in the position including the center of the case 110.

A plurality of batteries 54 may be provided. In this case, any one of the batteries 54 can satisfy the above condition regarding the position. Alternatively, for example, even if a space portion between one battery 54 and another battery 54 among the plurality of batteries 54 is positioned in the center position, if an envelope of the outer shape of the plurality of batteries 54 is provided to include the center position, the above condition regarding the position is satisfied.

Figure 6:
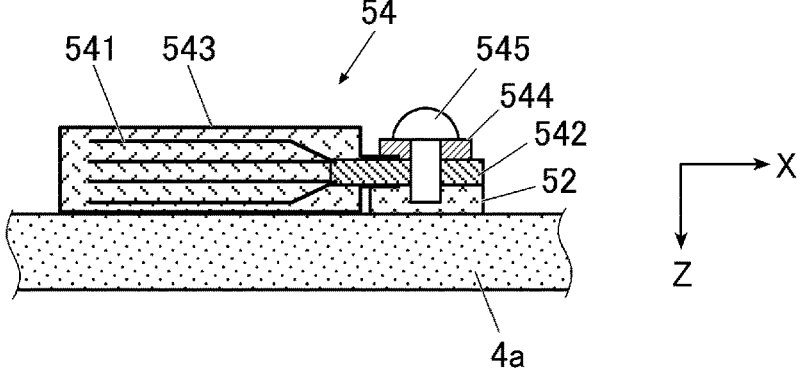
FIG. 6 is a diagram showing an example of battery attachment.

FIG. 6 is a diagram showing an example of battery attachment of the battery 54. In FIG. 6, the top and bottom (Z-axis direction) is reverse from FIG. 3.

As shown in FIG. 6, the battery 54 accumulates power by a stacked electrode 541 in which thin electrodes are stacked in a liquid. Regarding the battery 54, the stacked electrode 541 is collectively projected outside as a terminal 542, and the surrounding area of the stacked electrode 541 is sealed with a sealing bag 543.

There are two terminals included in the terminal 542, a +pole and a −pole. The terminal 542 is fixed to the circuit substrate 52 with a screw 545 through an insulating member 544 which is an insulator. The terminal 542 supplies power through the wiring connected to the circuit substrate 52. In order to simplify the description, only one pole is illustrated in FIG. 6.

The sealing bag 543 is fixed by aluminum vapor deposition so that the contents do not leak. Therefore, if the screw 545 to fix the terminal to the circuit substrate 52 comes into contact with the sealing bag 543, conduction through the sealing bag 543 occurs. This causes a short circuit in the +pole and the −pole.

Therefore, as described above, by fixing the terminal 542 with the screw 545 with an insulating member 544 in between, an insulating member 544 can be placed in between the screw 545 and the sealing bag 543. With this, it is possible to prevent the short circuit between the +pole and the −pole.

Figure 7A:
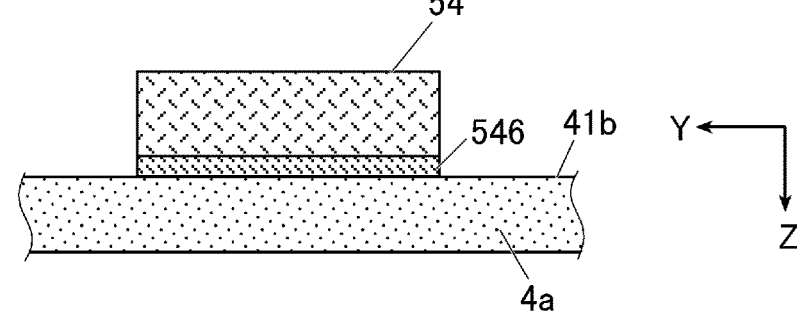
FIG. 7A is a diagram showing an example of battery attachment.

FIG. 7A shows an example of battery attachment of the battery 54. In FIG. 7, the top and bottom (Z-axis direction) is reverse from FIG. 3.

As shown in FIG. 7A, the battery 54 is attached to the plane shaped supporting portion 4a through the adhesive material 546.

The adhesive material 546 is adhesive, double-sided adhesive tape and the like which are peelable. The peelable adhesive material 546 is used so that if the battery 54 deteriorates over time, the battery 54 can be removed and exchanged.

Figure 7B:
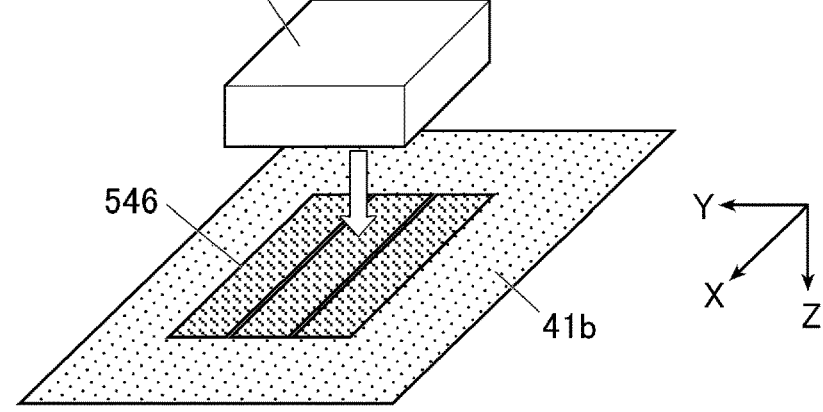
FIG. 7B is a diagram showing an example of battery attachment.

If the terminal 542 of the battery 54 is bent when the battery 54 is peeled off from the plane shaped supporting portion 4a, there is a possibility that a short circuit occurs in the stacked electrode 541. Therefore, preferably, the adhesive material 546 such as 704 series manufactured by TESA is used. This is a type in which the adhesive material 546 itself can be peeled from the adhered subjects by pulling the adhesive material. In this case, since it is difficult to peel the adhesive material 546 if the width is wide, as shown in FIG. 7B, the adhesive material may be strips with narrow widths and this may be arranged aligned on the pasted surface of the battery 54.

Figure 7C:
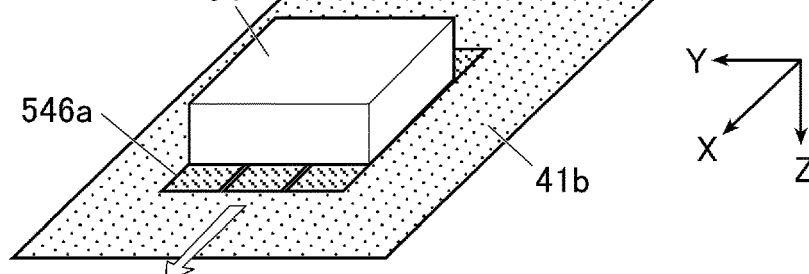
FIG. 7C is a diagram showing an example of battery attachment.

As shown in FIG. 7C, if the edge of the strip of the adhesive material 546 projects outside from the pasted surface of the battery 54 as a pulling portion 546a to pull the adhesive material 546, it is easy to peel the adhesive material 546. The pulling portion 546a may be reinforced with a resin film so that this does not break when being pulled. In FIG. 7C, the direction that the puling portion 546a is to be pulled is shown with an arrow.

As shown in FIG. 2, the battery 54 is provided so that the terminal 542 projects in a direction perpendicular to the side of the case 110 where the connector 51 is provided (X-axis direction).

When the radiation imaging apparatus 100 is put in a bin or a cradle of a mobile medical vehicle to be charged and the connector 51 is connected to the charging portion in the bin or the cradle, the radiation imaging apparatus 100 receives an impact in a direction perpendicular to the side of the case 110 where the connector 51 is provided (X-axis direction).

Therefore, as described above, by providing the battery 54 so that the terminal 542 projects in the direction perpendicular to the side of the case 110 where the connector 51 is provided (X-axis direction), it is possible to prevent the impact being provided perpendicularly to the projecting direction of the terminal 542. With this, it is possible to prevent damage to the terminal 542.

(2-3-4. Irradiation Detecting Sensor)

The irradiation detecting sensor 55 detects the radiation irradiated on the front surface 110a. The irradiation detecting sensor 55 is connected to the circuit substrate 52, and outputs the detected result to the circuit substrate 52.

As shown in FIG. 2 and FIG. 3, the irradiation detecting sensor 55 is attached to the plane shaped supporting portion 4a near the center of the case 110, and is stored in the concave portion 4c.

[2-4. Cushioning Material]

As shown in FIG. 3, the cushioning material 6 is a spacer attached between the circuit substrate 52 and the rear surface portion 21 of the case 110.

At least a portion of the cushioning material 6 is positioned with a space between the battery 54, and the center of the cushioning material is positioned toward the center of the case 110 between the edge of the case 110 (lateral surface 110c) and the center. Specifically, it is preferable to position the cushioning material in a range 10×12 inches from the center of the rear surface portion 21 which is near the center where the load is applied. Preferably, at least a portion of the cushioning material 6 is positioned in the position including the center of the case 110.

According to the above configuration, the load applied near the center of the case 110 is supported by distributing on the battery 54 and the cushioning material 6. Therefore, it is possible to prevent the radiation detector 3 from bending due to the load.

<Modification 1>

Next, the modification 1 according to the present invention is described. In the modification 1, the same reference numerals are applied to the components the same as the above embodiment, and the description is omitted.

Figures 8, 9, 10:
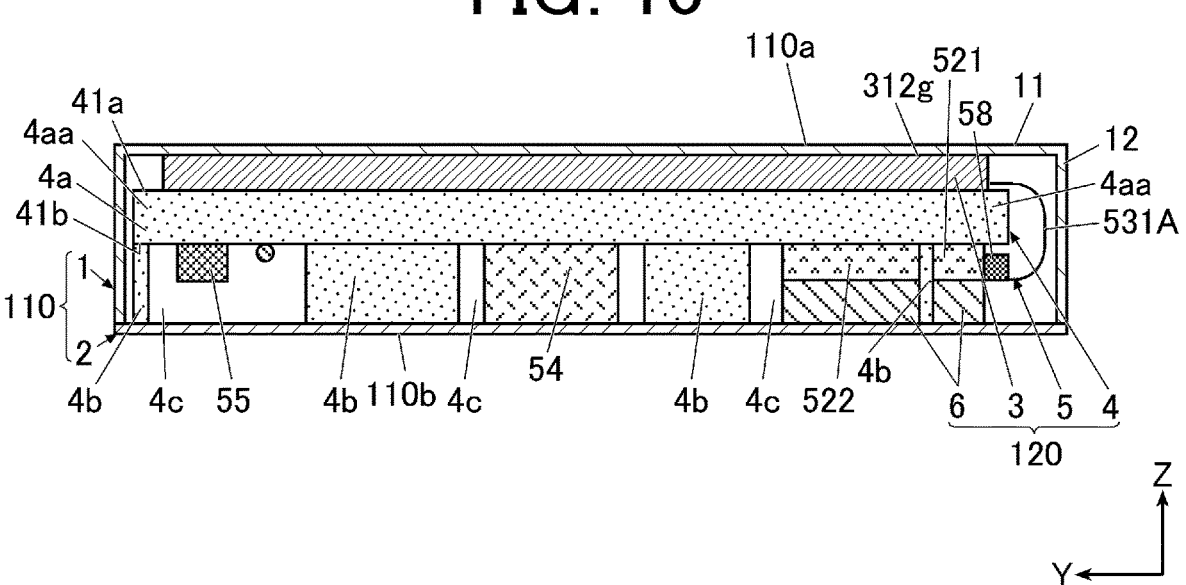
FIG. 8 is a detailed diagram of a region VIII shown in FIG. 3 according to modification 1.
FIG. 9 is a cross-sectional view of the radiation imaging apparatus from line III-III shown in FIG. 1A according to modification 2.
FIG. 10 is a cross-sectional view of the radiation imaging apparatus from line III-III shown in FIG. 1A according to modification 3.

FIG. 8 is a detailed diagram showing a region VIII shown in FIG. 3 according to the present modification.

As shown in FIG. 8, an attaching member 4d which has a female thread is provided in the plane shaped supporting portion 4a of the present modification. The attaching member 4d is used when the screw 4da passes through the hole opened in the circuit substrate 52 (control substrate 522). With this, the circuit substrate 52 (control substrate 522) is fixed to the plane shaped supporting portion 4a.

The cushioning material 6 includes a cutout portion 61 in a portion facing the attaching member 4d with the circuit substrate 52 (control substrate 522) in between. With this, when a load F is applied to the radiation imaging apparatus 100 as shown in FIG. 8, it is possible to prevent reaction force occurring by the attaching member 4d. Therefore, the reaction force acts on the radiation detector 3 and it is possible to reduce the unevenness occurring in the imaged image.

<Modification 2>

Next, the modification 2 according to the present invention is described. In the modification 2, the same reference numerals are applied to the components the same as the above embodiment, and the description is omitted.

FIG. 9 is a cross-sectional view of the radiation imaging apparatus 100 from line Ill-III shown in FIG. 1A according to the present modification.

As shown in FIG. 9, the internal module 120 of the present modification includes a supporting portion 4A instead of the supporter 4.

The supporter 4A includes a plane shaped supporting portion 4Aa with a thickness thinner than the plane shaped supporting portion 4a (length in Z-axis direction is short) and a leg shaped supporting portion 4Ab with a thickness thicker than the leg shaped supporting portion 4b (length in Z-axis direction is long).

The supporter 4A is formed from a metal or a resin. Preferably, the supporter 4A has substantially the same thermal expansion coefficient as the sensor panel 31.

In this case, if the plane shaped supporting portion 4Aa is made thicker, the weight increases. Therefore, the height of the concave portion 4c cannot be made smaller to match the height of the battery 54 (length in the thickness direction of the plane shaped supporting portion 4Aa (Z-axis direction)).

In view of the above, as shown in FIG. 9, a cushioning material 6 is provided between the battery 54 and the rear surface portion 21, and the space in the height direction of the concave portion 4c (Z-axis direction) is filled.

As described above, by providing a cushioning material 6 between the battery 54 and the rear surface portion 21, it is possible to eliminate the difference in the level between the battery 54 and the other components (leg shaped supporting portion 4b, etc.). Therefore, the uneven pressure on the battery 54 can be prevented.

According to the present embodiment, as shown in FIG. 9, the cushioning material 6 may be provided between the battery 54 and the rear surface 21.

<Modification 3>

Next, the modification 3 according to the present invention is described. In the modification 3, the same reference numerals are applied to the components the same as the above embodiment, and the description is omitted.

FIG. 10 is a cross-sectional view of the radiation imaging apparatus 100 from line III-III shown in FIG. 1A according to the present modification.

As shown in FIG. 10, according to the present modification, the irradiation detecting sensor 55 is provided in a peripheral portion of the case 110 (the peripheral portion of the plane shaped supporting portion 4*a*).

The location where the concave portion 4*c* in which the irradiation detecting sensor 55 is stored is formed is thinner than the other portions (leg shaped supporting portion 4*b*). Therefore, when the load is applied to the radiation imaging apparatus 100, this portion tends to bend. When the load is applied in the portion near the edge (lateral surface 110*c*) of the case 110, the lateral surface 110*c* supports the load, and the bend is suppressed. Therefore, by placing the irradiation detecting sensor 55 in a portion (the peripheral portion of the plane shaped supporting portion 4*a*) near an edge of the case 110, it is possible to suppress the bend of the concave portion 4*c* in which the irradiation detecting sensor 55 is stored even when the load is applied. Then, since the bend of the radiation detector 3 is suppressed, it is possible to reduce the unevenness in the imaged image.

<Modification 4>

Next, the modification 4 according to the present invention is described. In the modification 4, the same reference numerals are applied to the components the same as the above embodiment, and the description is omitted.

Figure 11A:
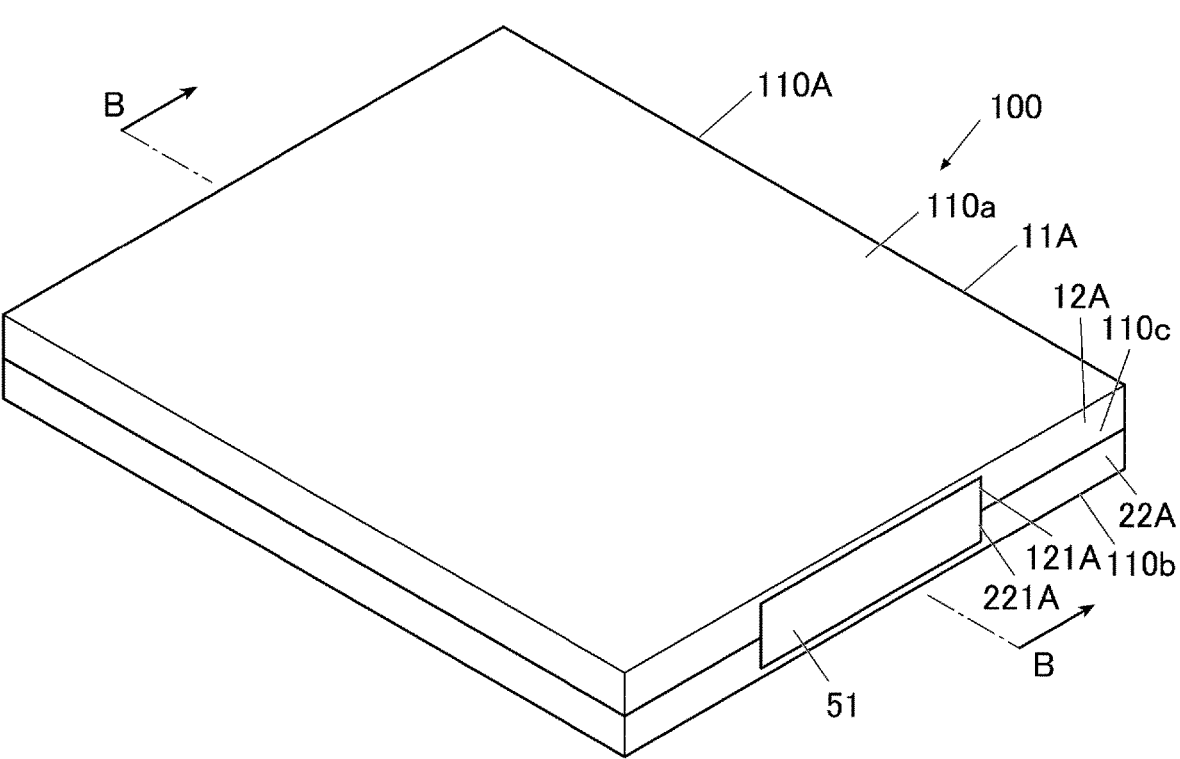
FIG. 11A is a perspective view that shows a view of a front surface and some lateral surfaces of a radiation imaging apparatus according to modification 4.
Figure 11B:
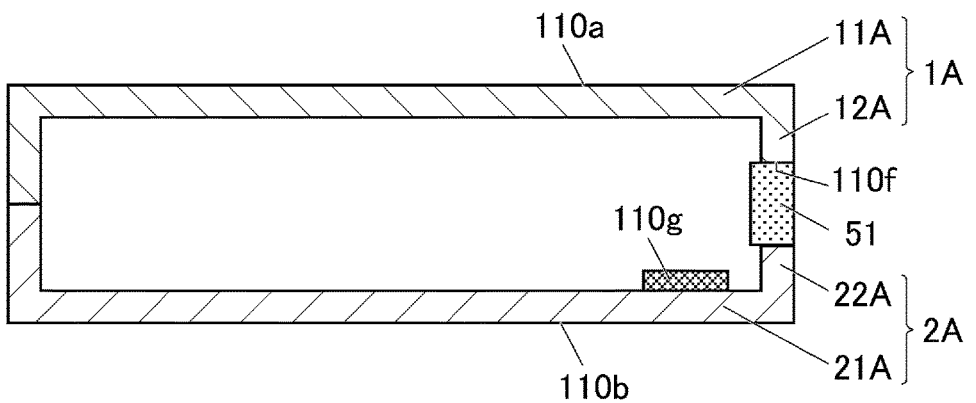
FIG. 11B is a cross-sectional view of the radiation imaging apparatus from line B-B shown in FIG. 11A according to modification 4.

FIG. 11A is a perspective view when a front surface 110*a* and some lateral surfaces 110*c* of a radiation imaging apparatus 100 according to modification 4 are viewed. FIG. 11B is a cross-sectional view of the radiation imaging apparatus 100 from line B-B shown in FIG. 11A. In FIG. 11B, the portions other than the case 110A and the connector 51 are omitted.

As shown in FIG. 11A and FIG. 11B, according to the present modification, the case 110A includes a box 1A and a box 2A, and is shaped in a rectangular panel shape.

The box 1A includes a front surface portion 11A and a lateral surface portion 12A.

The front surface portion 11A and the lateral surface portion 12A are formed as one. Alternatively, the front surface portion 11A and the lateral surface portion 12A may be separate components.

The box 2A includes a rear surface portion 21A and a lateral surface portion 22A.

The rear surface portion 21A and the lateral surface portion 22A are formed as one. Alternatively, the rear surface portion 21A and the lateral surface portion 22A may be separate components.

The case 110A includes an opening 110*f* formed by a cutout portion 121A provided in the lateral surface portion 12A and a cutout portion 221A provided in the lateral surface portion 22A.

For example, the connector 51 is positioned in the opening 110*f*.

Near the opening 110*f*, the height of the lateral surface portion 12A and the lateral surface portion 22A (length in the direction perpendicular to the front surface 110*a* (Z-axis direction)) becomes lower than the other portions and the strength decreases.

As shown in FIG. 11B, the case 110 includes a reinforcing portion 110*g* on the rear surface 21A near the opening 110*f*. With this, it is possible to prevent decrease in the strength near the opening 110*f*.

The reinforcing portion 110*g* can be provided in only either the front surface portion 11A or the rear surface portion 21A or on both the front surface portion 11A and the rear surface portion 21A.

The reinforcing portion 110*g* can be formed as one with the rear surface 21A by making the portion near the opening 110*f* of the rear surface 21A thicker or the reinforcing portion 100*g* can be formed as a component different from the rear surface 21A.

<Modification 5>

Next, the modification 5 according to the present invention is described. In the modification 5, the same reference numerals are applied to the components the same as the above embodiment, and the description is omitted.

Figure 12:
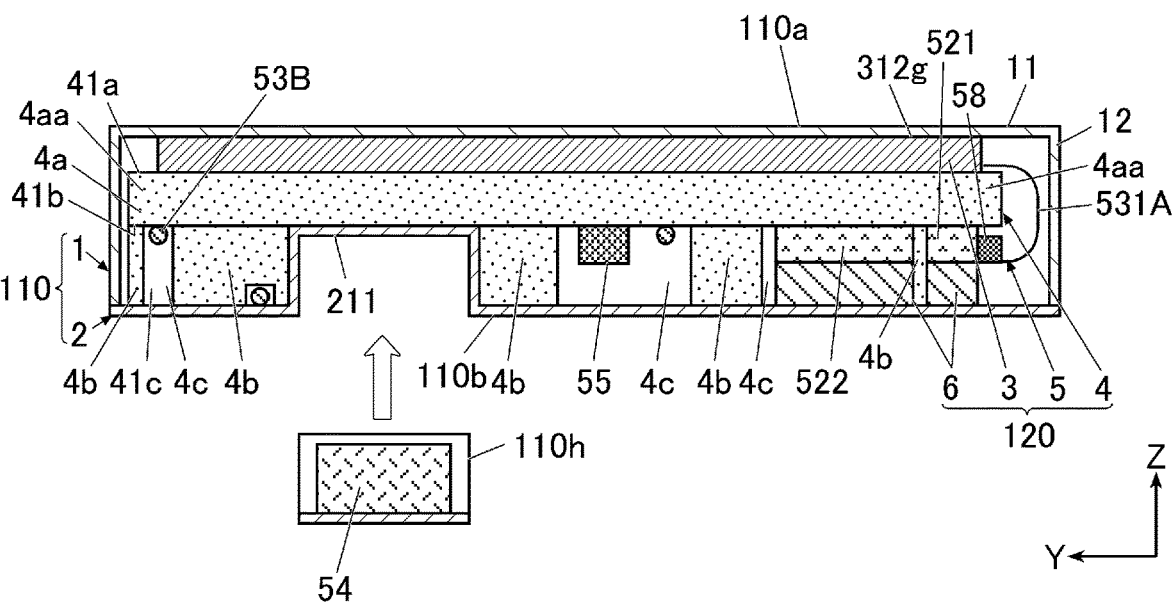
FIG. 12 is a cross-sectional view of the radiation imaging apparatus from line III-III shown in FIG. 1A according to modification 5.

FIG. 12 is a cross-sectional view of the radiation imaging apparatus 100 from line III-III shown in FIG. 1A according to the present modification.

According to the present modification, as shown in FIG. 12, the case 110 includes a concave portion 211 to store the battery 54. The concave portion 211 is located toward the center between the edge of the case 110 (lateral surface 110*c*) and the center.

The case 110 includes a storage 110*h* that stores the battery 54.

The storage 110*h* storing the battery 54 is stored in the concave portion 211.

According to the above configuration, the battery 54 can be easily attached to and detached from the radiation imaging apparatus 100.

<Modification 6>

Next, the modification 6 according to the present invention is described. In the modification 6, the same reference numerals are applied to the components the same as the above embodiment, and the description is omitted.

Figure 13:
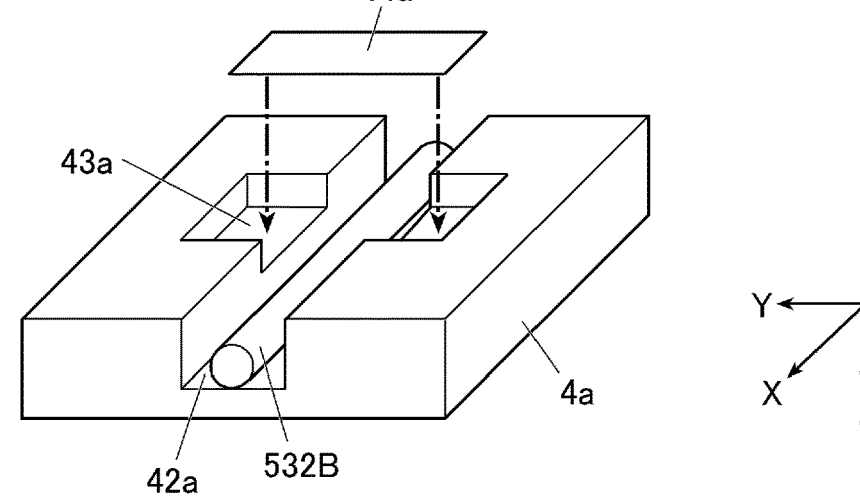
FIG. 13 is a diagram showing an example of fixing wiring to a supporter in modification 6.

FIG. 13 is a diagram showing an example of fixing the irradiation detecting sensor wiring 532B to the supporter 4 (plane shaped supporting portion 4*a*). In FIG. 13, the top and bottom (Z-axis direction) is reverse from FIG. 3.

In the present modification, as shown in FIG. 13, an electric wiring groove 42*a* is formed in the supporter 4 (plane shaped supporting portion 4*a*). A wiring fixing concave portion 43*a* is formed in a position of the supporter 4 where the irradiation detecting sensor wiring 532B is fixed.

When the radiation imaging apparatus 100 is assembled, the irradiation detecting sensor wiring 532B is positioned in the groove 42*a* and fixed with a fixing member 44*a* (adhesive tape, etc.) in the wiring fixing concave portion 43*a*.

When the wiring other than the irradiation detecting sensor wiring 532B (wiring 53B and GND wiring 531B, etc.) is attached to the supporter 4, the wiring can be fixed similar to the above configuration.

By forming the groove 42*a* in the supporter 4, it is possible to clearly understand the position where the irradiation detecting sensor wiring 532B is positioned. Therefore, it becomes easy to assemble the radiation detecting apparatus 100.

By forming the wiring fixing concave portion 43*a* in the supporter 4, the fixing position of the irradiation detecting sensor wiring 532B is not mistaken and the radiation imaging apparatus 100 is easily assembled.

When the supporter 4 is formed by a foam bead method, the supporter 4 typically becomes white, and the colored wiring and members are easily visible. Therefore, errors in the position of the wiring and errors in the fixing can be prevented.

<Modification 7>

Next, the modification 7 according to the present invention is described. In the modification 7, the same reference numerals are applied to the components the same as the above embodiment, and the description is omitted.

Figure 14:
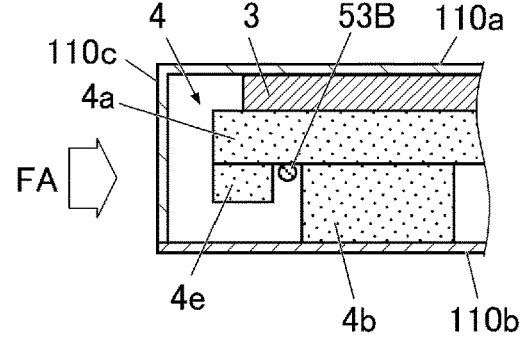
FIG. 14 is a diagram showing an area near an edge of a case in a cross-sectional view of the radiation imaging apparatus from line III-III shown in FIG. 1A according to modification 7.

FIG. 14 is a diagram showing an area near an edge of a case 110 in a cross-sectional view of the radiation imaging apparatus 100 from line 111-111 shown in FIG. 1A according to the present modification.

According to the present modification, as shown in FIG. 14, the supporter 4 includes a thick portion 4e.

The thick portion 4e is provided on the plane shaped supporting portion 4a near the edge of the case 110 (edge of plane shaped supporting portion 4a).

The plane shaped supporting portion 4a and the thick portion 4e can be formed as one by making the portion near the edge of the plane shaped supporting portion 4a thick or the plane shaped supporting portion 4a can be formed as a component different from the thick portion 4e.

In a situation that the supporter 4 is formed of a foam material, the radiation imaging apparatus 100 becomes weak against an impact FA in a direction parallel to the supporting surface 41a of the plane shaped supporting portion 4a (direction parallel to a surface formed by the X-axis and the Y-axis) shown in FIG. 14, and the radiation imaging apparatus 100 may easily break. For example, if the impact FA is received from the direction of the lateral surface 110c due to dropping the radiation imaging apparatus 100, the radiation imaging apparatus 100 may be bent or buckling may occur. This may lead to damage in the radiation imaging apparatus 100.

Therefore, by providing the thick portion 4e in the supporter 4, the strength of the edge of the radiation imaging apparatus 100 (case 110) may be enhanced.

<Modification 8>

Next, the modification 8 according to the present invention is described. In the modification 8, the same reference numerals are applied to the components the same as the above embodiment, and the description is omitted.

Figure 15:
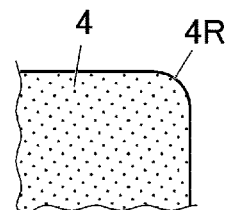
FIG. 15 is a diagram showing an area near a corner of a supporter in modification 8.

FIG. 15 is a diagram showing an area near a corner of the supporter 4.

According to the present modification, as shown in FIG. 15, the supporter 4 includes a curved surface 4R including a predetermined radius of a curvature in a corner of the supporter 4 (plane shaped supporting portion 4a or leg shaped supporting portion 4b).

The supporter 4 is not limited to the corner of the supporter 4 and may include a curved surface with a predetermined radius of a curvature at a ridge line of the supporter 4. The corner may be chamfered instead of forming a curved surface.

When the supporter 4 is formed of a foam material (specifically, formed by a bead method foam), the ridge line or the corner of the supporter 4 tend to be damaged when the radiation imaging apparatus 100 hits something. Specifically, depending on how the radiation imaging apparatus 100 is handled during assembly, the supporter 4 may be chipped, and fallen foam material may enter other portions inside the radiation imaging apparatus 100. This may have a bad influence on the imaging.

In view of the above, by providing a curved surface 4R in the ridge line or corner of the supporter 4 or performing chamfering on the supporter 4, it becomes difficult for the supporter 4 to chip. With this, the damage to the supporter 4 can be prevented.

<Modification 9>

Next, the modification 9 according to the present invention is described. In the modification 9, the same reference numerals are applied to the components the same as the above embodiment, and the description is omitted.

Figure 16:
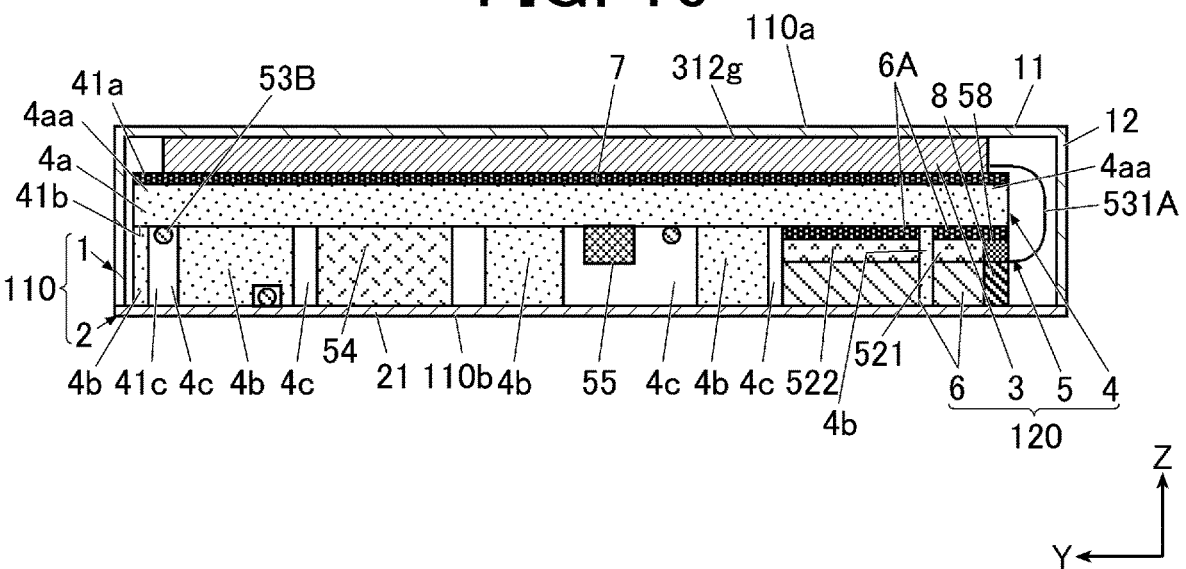
FIG. 16 is a cross-sectional view of the radiation imaging apparatus from line III-III shown in FIG. 1A according to modification 9.

FIG. 16 is a cross-sectional view of the radiation imaging apparatus 100 from line III-III shown in FIG. 1A according to the present modification.

As shown in FIG. 16, according to the present modification, the internal module 120 includes a shield layer 7.

The shield layer 7 is for decreasing the charging influence on the radiation detector 3 due to the supporter 4.

The shield layer 7 is the same shape as the supporting surface 41a of the plane shaped supporting portion 4a. The shield layer 7 is provided between the radiation detector 3 and the plane shaped supporting portion 4a, and covers the entire surface of the supporting surface 41a.

The shield layer 7 is positioned in a position facing at least a portion of the wiring 53A (wiring 531A) that passes the lateral surface of the plane shaped supporting portion 4a among the surfaces of the supporter 4 (plane shaped supporting portion 4a) outside the planar view region of the radiation detector 3 and that connects the circuit substrate 52 and the radiation detector 3. The supporter 4 (plane shaped supporting portion 4a) outside the planar view region of the radiation detector 3 is an extending portion 4aa.

The shield layer 7 is provided in a position facing the wiring 53A (wiring 531A) of the supporting surface 41a (surface of the radiation detector 3 side) of the extending portion 4aa.

A metal thin film or a film with which metal is attached by vapor deposition is used in the shield layer 7.

In a situation that the supporter 4 is formed by a foam material (bead method foam) that is easily charged, if the supporter 4 is vibrated in a charged state by disturbance, the radiation detector 3 receives influence of the charge and unevenness tends to occur in the imaged image. In an imaging method in which the radiation imaging apparatus 100 is not linked with the radiation irradiating apparatus and the irradiation of radiation is detected by using some of the output signals of the radiation detector 3, even if the radiation is not irradiated, an erroneous detection showing that the radiation is irradiated may be made by the noise due to the influence of the charge.

Conventionally, if the supporter 4 is material that is not charged as much as the bead method foam, the influence of the charge was small even if the shield layer 7 is the same shape as the radiation detector 3 and there are portions not covering the supporter 4. However, if the supporter 4 is a bead method foam that is easily charged, if there is a portion of the supporter 4 that is not covered by the shield layer 7, this portion may receive influence of the charge.

Therefore, as described above, by covering the entire surface of the supporting surface 41a of the shield layer 7, compared to the situation in which the shield layer is the same shape as the radiation detector 3, the influence of the charge on the radiation detector 3 can be reduced, and the unevenness on the imaged image can be reduced. Moreover, it is possible to reduce erroneous detection showing that the irradiation of radiation is detected.

The charge of the supporter 4 influences the signal passing the wiring 53A (wiring 531A) connecting the circuit substrate 52 and the radiation detector 3 and may cause unevenness and erroneous detection. Therefore, in at least the side where the wiring 53A (wiring 531A) exists, covering the entire surface of the supporting surface 41a of the supporter 4 can suppress the influence. Further, if the shield layer 7 is extended to the end surface and the rear surface of the supporter 4, the suppressing effect becomes large.

Instead of the internal module 120 being provided with the shield layer 7, a lower side shield layer 332 (see FIG. 21) which is an electromagnetic field shield layer 33 on the Z-axis minus direction side provided on the surface on the opposite side of the imaging surface 312g can be the same shape as the supporting surface 41a. With this, the lower side shield layer 332 can be provided so as to cover the entire surface of the supporting surface 41a. Alternatively, the above-described radiation screening layer 32 can be used as the shield layer and may cover the entire surface of the supporting surface 41a. In this case, the lower side shield layer 332 or the radiation screening layer 32 is connected to the ground (GND).

In this case, there is no need to provide a separate shield layer 7. Therefore, the radiation imaging apparatus 100 can be made lighter and the ease of assembly can be enhanced.

As shown in FIG. 16, according to the present modification, the internal module 120 includes a thermal conductive material 8.

The thermal conductive material 8 is for dissipating heat from a readout IC 58.

The thermal conductive material 8 is positioned between the wiring 531A and the rear surface portion 21 in a position facing the readout IC 58 with the wiring 531A in between.

When the readout IC 58 is operated at a high speed, the readout IC 58 generates heat. If the temperature of the readout IC 58 becomes too high, the converted image data is displaced and unevenness occurs in the image. Specifically, when the successive imaging is performed in order to obtain a moving image, such problem tends to occur.

In view of the above, by thermally connecting the readout IC 58 with the rear surface portion 21 using the thermal conductive material 8, the heat of the readout IC 58 is dissipated. With this, it is possible to prevent the temperature from rising too much.

As shown in FIG. 16, according to the present modification, the internal module 120 includes a cushioning material 6A.

The cushioning material 6A is positioned between the plane shaped supporting portion 4a and the SIF substrate 521.

Preferably, a damping rubber which can suppress vibration more than a porous (sponge type) resin material is used as the cushioning material 6A.

As shown in FIG. 2, the wiring 531A is positioned aligned along a side of the case 110. The SIF substrate 521 is an elongated shape along a side of the case 110, and is positioned along a side of the case 110.

In a situation that the supporter 4 is formed by the foam material, since the foam material is light, the supporter 4 easily vibrates. Due to the vibration of the supporter 4, the various circuit substrates 52 attached to the supporter 4 also similarly vibrate. For example, since the SIF substrate 521 is an elongated shape, the node of vibration is the attached position of the SIF substrate 521, and the antinode of the vibration is between the attached positions. When the SIF substrate 521 vibrates, the resistance of the circuit on the substrate changes, the noise is applied to the output signal of the radiation detector 3, and the unevenness may occur in the imaged image.

As described above, by positioning the cushioning material 6A between the plane shaped supporting portion 4a and the SIF substrate 521, the vibration of the SIF substrate 521 is suppressed and it is possible to prevent the unevenness being generated in the imaged image.

As shown in FIG. 16, in order to suppress the vibration of the the control substrate 522 and the readout IC 58, the cushioning material 6A may be positioned between the plane shaped supporting portion 4a and the control substrate 522 and the plane shaped supporting portion 4a and the readout IC 58.

Moreover, as shown in FIG. 2, the GIF substrate 523 is an elongated shape along a side of the case 110, and is positioned along a side of the case 110.

Similar to the SIF substrate 521, the GIF substrate 523 also vibrates with the vibration of the supporter 4.

In order to suppress the vibration of the GIF substrate 523, the cushioning material 6A may be positioned between the plane shaped supporting portion 4a and the GIF substrate 523.

Alternatively, in order to suppress the vibration of the gate driver IC provided on the wiring 532A, the cushioning material 6A may be positioned between the plane shaped supporting portion 4a and the gate driver IC. Compared to the readout IC 58, influence of the vibration on the gate driver IC is small. Therefore, in this case, the cushioning material 6A does not have to be a damping rubber and may be a porous resin material (sponge type).

<Modification 10>

Next, the modification 10 according to the present invention is described. In the modification 10, the same reference numerals are applied to the components the same as the above embodiment, and the description is omitted.

Figure 17A:
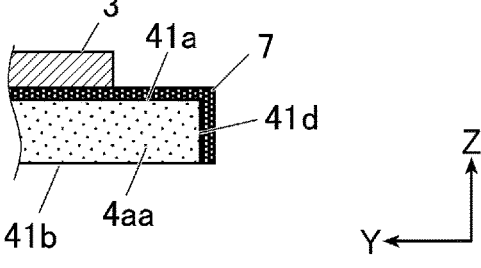
FIG. 17A is a diagram showing an area near an edge of a plane shaped supporting portion in a cross-sectional view of the radiation imaging apparatus from line III-III shown in FIG. 1A according to modification 10.
Figure 17B:
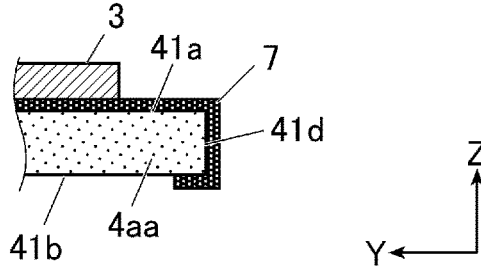
FIG. 17B is a diagram showing an area near an edge of a plane shaped supporting portion in a cross-sectional view of the radiation imaging apparatus from line III-III shown in FIG. 1A according to modification 10.

FIG. 17A and FIG. 17B are diagrams showing an area near an edge of a plane shaped supporting portion 4a in a cross-sectional view of the radiation imaging apparatus 100 from line III-III shown in FIG. 1A according to the present modification.

As shown in FIG. 17A and FIG. 17B, according to the present modification, the internal module 120 includes a shield layer 7.

As shown in FIG. 17A, the shield layer 7 may be provided so as to cover an entire surface of the supporting surface 41a, and a lateral surface 41d of the plane shaped supporting portion 4a (extending portion 4aa). The plane shaped supporting portion 4a is the same shape as the radiation detector 3. Even in a situation that the extending portion 4aa does not exist, the shield layer 7 may be provided so as to cover the entire supporting surface 41a, and the lateral surface 41d of the plane shaped supporting portion 4a.

As shown in FIG. 17B, the shield layer 7 may be provided on an entire surface of the supporting surface 41a, a lateral surface 41d of the plane shaped supporting portion 4a (extending portion 4aa) and at least a portion of the opposite surface 41b in the extending portion 4aa.

With this, the influence on the radiation detector 3 due to charging can be reduced.

<Modification 11>

Next, the modification 11 according to the present invention is described. In the modification 11, the same reference numerals are applied to the components the same as the above embodiment, and the description is omitted.

Figure 18:
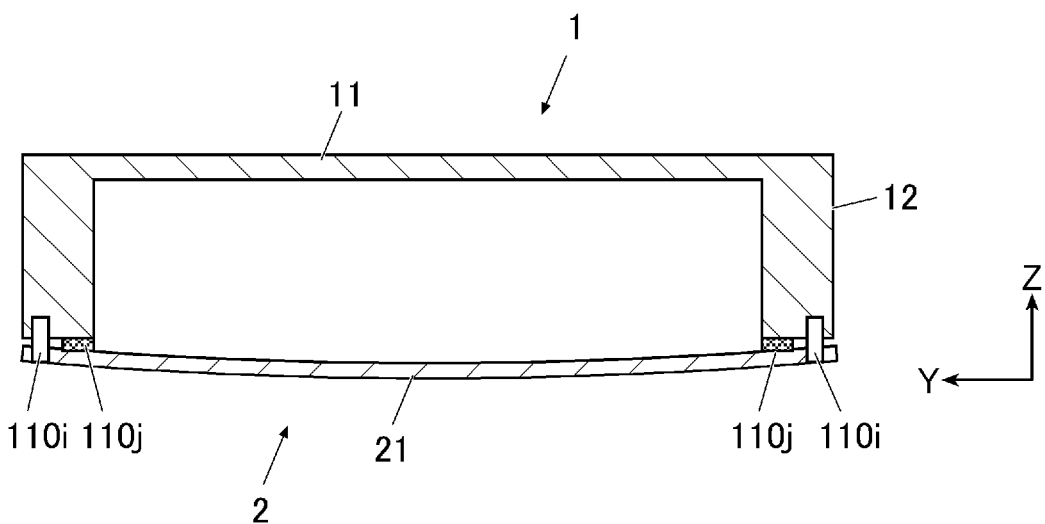
FIG. 18 is a cross-sectional view of the radiation imaging apparatus from line III-III shown in FIG. 1A according to modification 11.

FIG. 18 is a cross-sectional view of the radiation imaging apparatus 100 from line III-III shown in FIG. 1A according to the present modification. In FIG. 18, the portions other than the case 110 are omitted.

As shown in FIG. 18, according to the present modification, the case 110 includes a fastening member 10i and a waterproof member 110j.

The lid 2 is attached to the case 100 with the waterproof member 110j in between using the fastening member 110i.

In a situation that lightweight metal such as aluminum and magnesium or carbon fiber reinforced resin (CFRP) is used as the material of the case 110, warping and twisting occurs in the lid 2 (rear surface portion 21). As in the above configuration, in a situation that the lid 2 is a flat plate shape and the waterproof member 110j is provided between the box 1 and the lid 2, as shown in FIG. 18, a large warp occurs in the lid 2 (rear surface portion 21).

In a situation that the warp occurs in the lid 2, the case 110 becomes uneven in the thickness direction (Z-axis direction). As a result, the thickness exceeds the thickness specified by the JIS standard, and there is a possibility that the case 110 cannot be placed on the imaging stage.

In order to suppress warping of the lid 2, according to the present modification, the case 110 includes a draw-in mechanism in which the supporter 4 and the rear surface portion 21 are connected to draw in the rear surface portion 21.

Figure 19A:
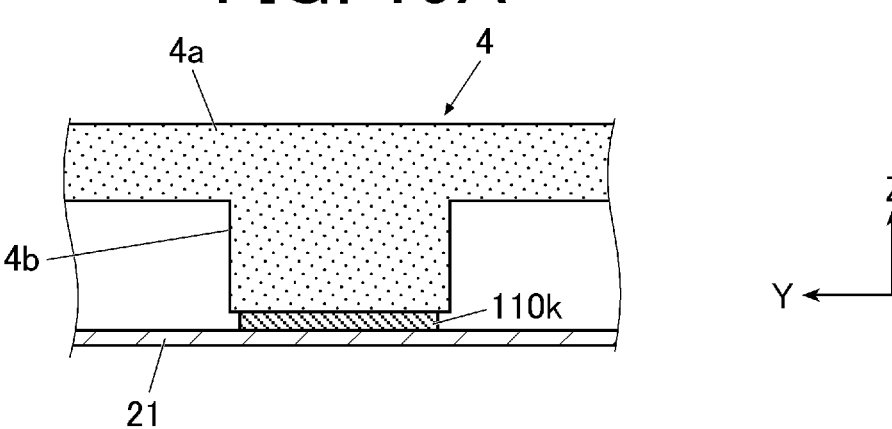
FIG. 19A is a diagram showing an example of a draw-in mechanism according to modification 11.
Figure 19B:
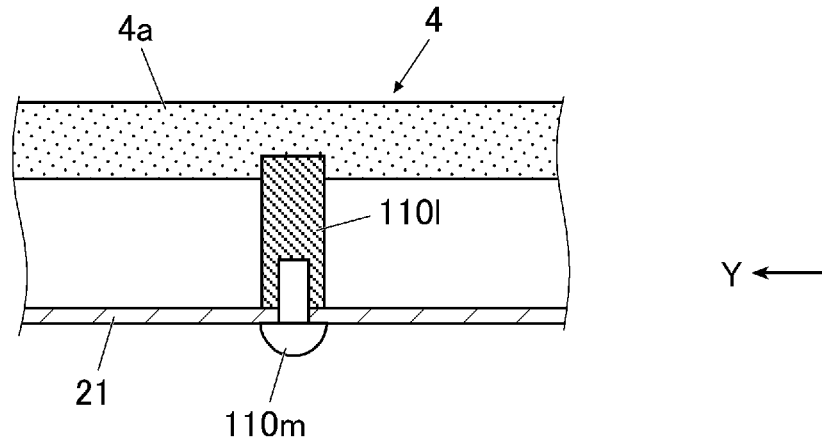
FIG. 19B is a diagram showing an example of a draw-in mechanism according to modification 11.

FIG. 19A and FIG. 19B show an example of the draw-in mechanism.

According to the example shown in FIG. 19A, the leg shaped supporting portion 4b and the rear surface portion 21 are fixed to each other using a fixer 110k. The fixer 110k may be a hardening adhesive or a pressure sensitive adhesive. The method of fixing shown in FIG. 19A is a method in which the cost of the components is low and the steps for assembly are simple.

According to the example shown in FIG. 19B, a draw-in member 110l that includes a female thread is provided in the plane shaped supporting portion 4a. By passing a screw 110m through a hole opened in the rear surface portion 21, the rear surface portion 21 is fixed to the draw-in member 110l. According to the fixing method shown in FIG. 19B, there is no possibility that the supporter 4 is damaged when the lid 2 is detached from the box 1 in a situation such as inspection or repair of the radiation imaging apparatus 100.

As described above, in a situation that warping occurs in the lid 2, there is a possibility that the connection between the thermal conductive material 8 and the readout IC 58 through the wiring 531A becomes insufficient.

Figure 20A:
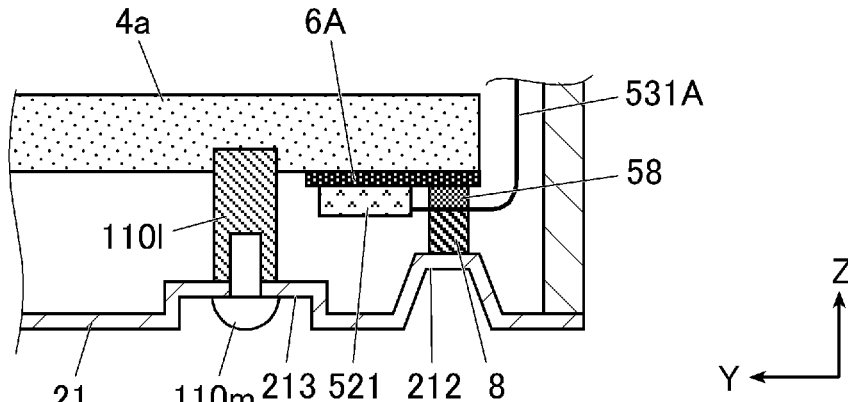
FIG. 20A is a diagram showing an example of a draw-in mechanism according to modification 11.

In order to make the contact between the thermal conductive material 8 and the readout IC 58 secure, according to the present modification, the case 110 includes the draw-in mechanism shown in FIG. 20A.

According to the example shown in FIG. 20A, the draw-in member 110l is provided in the plane shaped supporting portion 4a near the thermal conductive material 8. By passing the screw 110m through the hole opened in the rear surface portion 21, the rear surface portion 21 is fixed to the draw-in member 110l.

The draw-in mechanism may be provided near each of the four sides of the case 110 to suppress the warping of the entire lid 2, but it is preferable to provide the draw-in mechanism at least near the readout IC 58.

According to the present modification, the rear surface portion 21 includes concave portions 212 and 213.

The concave portion 212 is provided in a portion facing the thermal conductive material 8 of the rear surface portion 21.

With this, the strength of the rear surface portion 21 increases compared to the state when the rear surface portion 21 is a flat plane. Consequently, it is possible to make the thermal conductive material 8 come into secure contact with the readout IC 58 through the wiring 531A. Since the distance between the readout IC 58 and the rear surface portion 21 in the thickness direction of the case 110 (Z-axis direction) is short, it is possible to make the thickness of the thermal conductive material 8 small. With this, it is possible to enhance heat dissipation efficiency.

The user of the radiation imaging apparatus 100 is able to easily carry the radiation imaging apparatus 100 by grasping the concave portion 212.

The concave portion 213 is provided around the hole of the rear surface portion 21 through which the screw 110m is passed.

With this, it is possible to prevent the head of the screw 110m from projecting downward of the sheet of the diagram (Z-axis minus direction) than the rear surface portion 21. Consequently, it is possible to prevent problems in use such as the head of the screw 110m damaging the imaging stage and the head of the screw 110m getting stuck to the sheets of the bed.

Figure 20B:
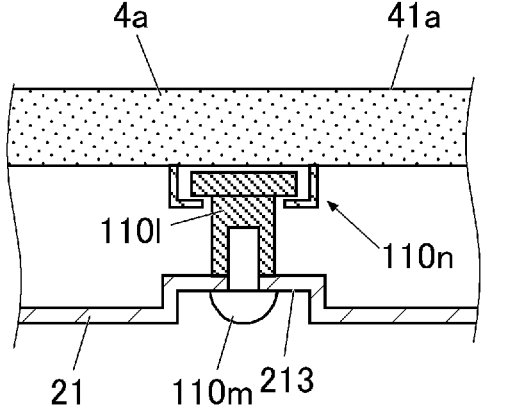
FIG. 20B is a diagram showing an example of a draw-in mechanism according to modification 11.
Figure 20B:
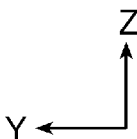

As shown in FIG. 20B, the case 110 includes a slider 110n in the connecting portion between the plane shaped supporting portion 4a and the draw-in member 110l. The slider 110n enables the draw-in member 110l to move in a direction parallel to the supporting surface 41a (direction parallel to the surface formed by the X-axis and the Y-axis).

With this, even if the position of the hole opened in the rear surface portion 21 to pass the screw 10m is displaced, by moving the draw-in member 110l, the rear surface portion 21 can be securely fixed to the draw-in member 110l by the screw 110m.

<Modification 12>

Next, the modification 12 according to the present invention is described. In the modification 12, the same reference numerals are applied to the components the same as the above embodiment, and the description is omitted.

Figure 21:
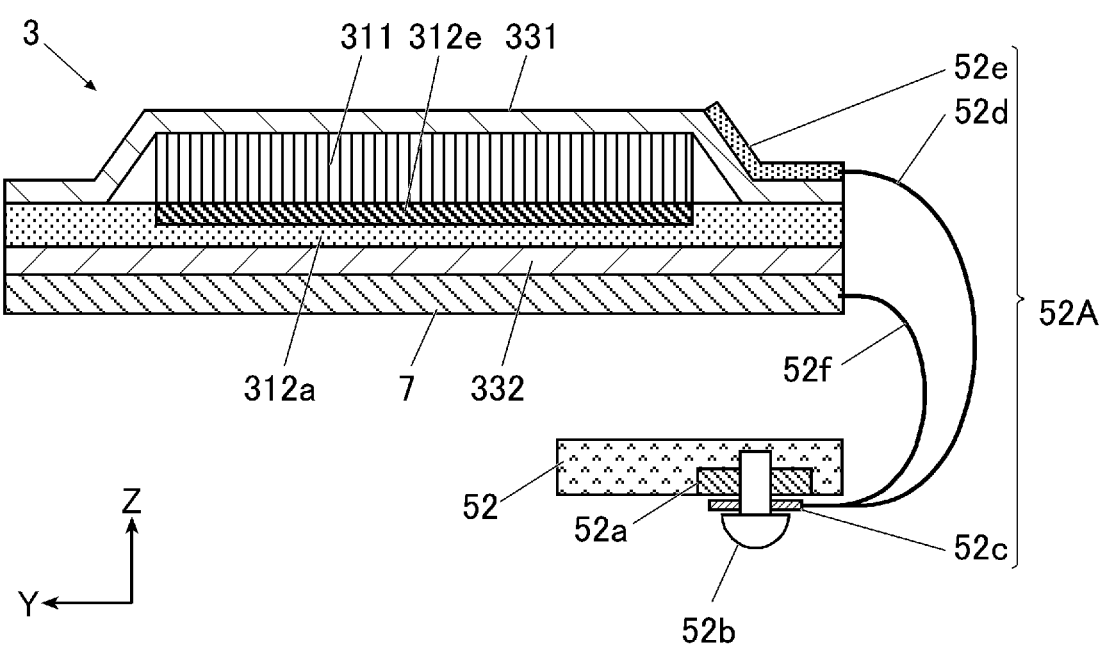
FIG. 21 is a diagram showing an example of ground connection of a radiation detector and a shield layer according to modification 12.

As shown in FIG. 21, according to the present modification, the internal module 120 includes a shield layer 7.

FIG. 21 is a diagram showing an example of ground connection of a radiation detector 3 and a shield layer 7.

As shown in FIG. 21, according to the present modification, the electromagnetic field shield layer 33 on the upper side of the sheet (Z-axis plus direction) is to be the upper side shield layer 331, and the electromagnetic field shield layer 33 on the lower side of the sheet (Z-axis minus direction) is to be the lower side shield layer 332.

The upper side shield layer 331 is formed of an aluminum vapor deposited film and is used as a shield by conducting the film with the ground.

The upper side shield layer 331 is conducted to the ground through a first conducting member 52A including a shield layer connector 52e, a conducting portion 52d and a terminal connector 52c.

The shield layer connector 52e is pasted to follow the shape from an inclined portion of the upper shield layer 331 which is an inclination as shown in FIG. 21 to the flat plane portion. Therefore, conductive tape with low elasticity such as those without a base or those with a thin base or soft material are used as the shield layer connector 52e.

The terminal connector 52c is fixed to the ground terminal 52a of the circuit substrate 52 by the screw 52b. Therefore, conductive tape with high elasticity such as tape including a thick base or a hard material is used as the terminal connector 52c so as not to be damaged by the force when the screw is fixed.

The conducting portion 52d connects the shield layer connector 52e and the terminal connector 52c. By using a resin film in which conductive paste is printed as the conducting portion 52d, it is preferable because there is enough strength so that it does not break by disturbance vibration.

Each portion of the first conducting member 52A may be formed and connected by a separate member as described above. Alternatively, the portions can be formed as one with a thin conductive tape. In this case, preferably, the hardness of each portion is changed according to the necessary functions. For example, the first conducting member 52A is maintained as a thin conductive tape in a soft state, the conducting portion 52d is strengthened with a resin film and the terminal connector 52c is strengthened using a thicker resin or metal film.

Moreover, the shield layer 7 is conducted to the ground through the second conducting member 52f and the terminal connector 52c. The shield layer 7 may also function as a radiation screening layer.

With this, since there is a shield above and below (Z-axis plus direction and minus direction) the switch element 312e (TFT, etc.), it is possible to protect the switch element 312e from disturbance noise.

Further, even if peeling of the lower side shield layer 332 and the shield layer 7 occurs and charging occurs, it is possible to suppress the influence of charging with the lower side shield layer 332. Alternatively, the influence of the peeling and charging of the shield layer 7 and the supporter 4 and the noise from the circuit substrate 52 can be suppressed by the lower side shield layer 332 and the shield layer 7. Moreover, the above effects are enhanced by connecting the shield layer 7 to the ground.

<Modification 13>

Next, the modification 13 according to the present invention is described. In the modification 13, the same reference numerals are applied to the components the same as the above embodiment, and the description is omitted.

According to the present modification, the internal module 120 includes the radiation screening layer as the shield layer 7. The shield layer 7 is connected to the ground and used as the shield. The shield layer 7 in this case is a lead shield member and is formed with a lead foil and an adhesive member.

Figure 22:
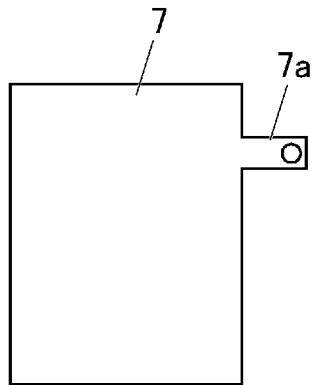
FIG. 22 is a diagram showing an example of a shield layer according to modification 13.

As shown in FIG. 22, the shield layer 7 includes a conducting portion 7a which is a projection that partially projects for ground conduction. Due to the above, the conducting member does not have to be provided separately. Therefore, it is possible to reduce the cost and to enhance the assembly performance of the radiation imaging apparatus 100.

The upper side shield layer 331 and/or the lower side shield layer 332 may be provided with a conducting portion that is similarly projected.

As described the radiation imaging apparatus 100 according to the present embodiment is a radiation imaging apparatus 100 that images the radiation image. The radiation imaging apparatus 100 includes, the radiation detector 3 that detects radiation, the supporter 4 that includes charging material and that supports the radiation detector 3, the conductive layer (shield layer 7) provided between the radiation detector 3 and the supporter 4, the electric circuit (electric circuit provided in the circuit substrate 52), and the electric wiring (wiring 53A) that passes the lateral surface of the supporter 4 (plane shaped supporting portion 4a) and that connects the radiation detector 3 and the electric circuit. The conductive layer is positioned in a position on the surface of the supporter 4 (plane shaped supporting portion 4a) outside the plan view region of the radiation detector 3 so as to face at least a portion of the electric wiring.

Consequently, since a portion on the surface of the supporter 4 (plane shaped supporting portion 4a) outside the plan view region of the radiation detector 3 facing at least a portion of the electric wiring is covered with the shield layer 7, it is possible to suppress the charging influence on the radiation detector 3 of the supporter 4 and the electric wiring which are formed from the charging material.

According to the radiation imaging apparatus 100 of the present embodiment, the supporter 4 is formed of foam material.

Therefore, it is possible to make the radiation imaging apparatus 100 lighter.

Moreover, the radiation detector 3 of the radiation imaging apparatus 100 according to the present embodiment includes a substrate 312a including flexibility, and the semiconductor element 312b formed in the imaging surface 312g of the substrate 312a.

Therefore, even if the radiation imaging apparatus 100 receives an impact, it is possible to make the sensor panel 31 difficult to break.

According to the radiation imaging apparatus 100 of the present embodiment, the supporter 4 includes the extending portion 4aa that extends past the radiation detector 3 in a direction parallel to the surface of the supporter 4 (supporting surface 41a), the surface being the surface that supports the radiation detector 3. The conductive layer is positioned in a position on the surface (supporting surface 41a) of the extending portion 4aa on the radiation detector 3 side so as to face the electric wiring.

Consequently, since the shield layer 7 covers the surface (supporting surface 41a) of the extending portion 4aa on the radiation detector 3 side, it is possible to suppress the charging influence of the supporter 4 including the charging material on the radiation detector 3 and the electric wiring.

According to the radiation imaging apparatus 100 of the present embodiment, the conductive layer is provided on the lateral surface 41d of the supporter 4 and/or the surface of the extending portion 4aa on the side opposite of the radiation detector 3.

Consequently, since the shield layer 7 covers the lateral surface 41d of the supporter 4 (plane shaped supporting portion 4a) on the radiation detector 3 side and/or the opposite surface 41d of the extending portion 4aa, it is possible to suppress the charging influence of the supporter 4 including the charging material on the radiation detector 3 and the electric wiring.

According to the radiation imaging apparatus 100 of the present embodiment, the conductive layer is the lead shield member.

Therefore, the radiation screening layer can be provided as the shield layer 7.

The present invention is not limited to the above-described embodiment and modifications, and various changes are possible. For example, in the supporter 4, the plane shaped supporting portion 4a and the leg shaped supporting portion 4b are molded as one with a single foam material, but the present invention is not limited to the above. The plane shaped supporting portion 4a and the leg shaped supporting portion 4b may be formed using foam materials that are different materials. The plane shaped supporting portion 4a and the leg shaped supporting portion 4b may be molded separately, and then after molding, the plane shaped supporting portion 4a may be pasted to the leg shaped supporting portion 4b.

Further, the shield layer 7 may be provided in only a part of the supporting surface 41a and the opposite surface 41b instead of providing on the lateral surface 41d of the plane shaped supporting portion 4a.

The internal module 120 (radiation imaging apparatus 100) does not need to include the supporter 4. In this case also, the battery 54 is positioned so that the center is positioned toward the center between the edge of the case 110 and the center, and supports the radiation detector 3.

Other specific configurations, contents and procedures of the operation, and the like as described in the above embodiments may be suitably changed without leaving the scope of the invention.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2022-028801, filed on Feb. 28, 2022, including description, claims, drawings and abstract is incorporated herein by reference in its entirety.

The invention claimed is:

1. A radiation imaging apparatus that images a radiation image, the apparatus comprising:

a radiation detector that detects radiation;

a supporter that includes charging material and that supports the radiation detector, wherein the supporter includes an extending portion that extends beyond the radiation detector in a direction parallel to a surface of the supporter, the surface being the surface that supports the radiation detector;

a conductive layer provided between the radiation detector and the supporter, on the surface of the supporter that supports the radiation detector, wherein the conductive layer is also provided on said surface of the supporter on the extending portion of the supporter;

an electronic circuit; and an electric wiring that passes a lateral surface of the supporter and that connects the radiation detector with the electronic circuit, wherein the lateral surface is a surface that intersects the surface that supports the radiation detector;

wherein the conductive layer on said surface of the supporter on the extending portion of the supporter faces a portion of the electric wiring, wherein the conductive layer is provided so as to cover the lateral surface of the supporter that intersects the surface that supports the radiation detector and that is passed by the electric wiring, and wherein the entire supporter is formed of foam material.

2. The radiation imaging apparatus according to claim 1, wherein the radiation detector includes a substrate having flexibility, and a semiconductor element that is formed on an imaging surface of the substrate.

3. The radiation imaging apparatus according to claim 1, wherein the conductive layer is provided on the lateral surface of the supporter and a back surface of the extending portion on a side thereof opposite to the surface of the supporter that supports the radiation detector.

4. The radiation imaging apparatus according to claim 1, wherein the conductive layer comprises a lead shield member.

5. The radiation imaging apparatus according to claim 1, wherein an area of the radiation detector in a plan view is smaller than an area of the supporter in the plan view.

* * * * *